(12) United States Patent
Munshi et al.

(10) Patent No.: US 12,442,337 B2
(45) Date of Patent: Oct. 14, 2025

(54) APPARATUS AND METHOD FOR REGULATING AND INJECTING GASEOUS FUEL INTO AN INTERNAL COMBUSTION ENGINE

(71) Applicant: HPDI Technology Limited Partnership, Vancouver (CA)

(72) Inventors: Sandeep Munshi, Delta (CA); Jian Huang, Surrey (CA); Ashish Singh, Surrey (CA); Gage Garner, Vancouver (CA); David Mumford, Vancouver (CA)

(73) Assignee: HPDI Technology L.P., Vancouver (CA)

( * ) Notice: Subject to any disclaimer, the term of this patent is extended or adjusted under 35 U.S.C. 154(b) by 0 days.

(21) Appl. No.: 18/835,007

(22) PCT Filed: Jan. 30, 2023

(86) PCT No.: PCT/CA2023/050122
§ 371 (c)(1),
(2) Date: Jul. 31, 2024

(87) PCT Pub. No.: WO2023/147651
PCT Pub. Date: Aug. 10, 2023

(65) Prior Publication Data
US 2025/0154913 A1     May 15, 2025

Related U.S. Application Data

(60) Provisional application No. 63/305,667, filed on Feb. 1, 2022.

(51) Int. Cl.
*F02D 19/06* (2006.01)
*F02D 19/08* (2006.01)

(52) U.S. Cl.
CPC ......... *F02D 19/08* (2013.01); *F02D 19/0644* (2013.01); *F02D 19/0652* (2013.01);
(Continued)

(58) Field of Classification Search
CPC ............. F02D 19/0678; F02D 19/0607; F02D 19/0642; F02D 19/0644; F02D 19/0665;
(Continued)

(56) References Cited

U.S. PATENT DOCUMENTS 9,328,677 B2 * 5/2016 Leone ................ F02D 41/3094
2002/0185086 A1  12/2002 Newman et al.
(Continued)

FOREIGN PATENT DOCUMENTS

CA          2699647 A1 * 10/2011 ............. F02B 21/00
CN     115306539 A * 11/2022
(Continued)

OTHER PUBLICATIONS

ISR and Written Opinion, mailed Jun. 8, 2023 for international application PCT/CA2023/050122; filed Jan. 30, 2023; 13 pages.

*Primary Examiner* — Lindsay M Low
*Assistant Examiner* — Teuta B Holbrook
(74) *Attorney, Agent, or Firm* — Carie C. Mager

(57) ABSTRACT

An apparatus includes a pressure regulator, an in-cylinder fuel injector and a controller programmed to, when fueling with a first gaseous fuel, command the regulator to regulate the pressure of the first gaseous fuel to a first injection pressure; and command the injector to inject within 90 CA° of TDC during a compression stroke an injected quantity of a first gaseous fuel into the combustion chamber at the first injection pressure, and when fueling with a second gaseous fuel, to command the regulator to regulate the pressure of the second gaseous fuel to a second injection pressure; and command the injector to inject within 90 CA° of TDC during (Continued)

the compression stroke an injected quantity of a second injected gaseous fuel.

30 Claims, 17 Drawing Sheets

(52) U.S. Cl.
CPC ..... *F02D 19/0665* (2013.01); *F02D 19/0676* (2013.01); *F02D 19/0678* (2013.01); *F02D 2200/101* (2013.01)

(58) Field of Classification Search
CPC ................ F02D 19/0676; F02D 19/08; F02D 2200/101; F02D 41/0027
See application file for complete search history.

(56) References Cited

U.S. PATENT DOCUMENTS

| | | |
|---|---|---|
| 2008/0103676 A1 | 5/2008 | Ancimer et al. |
| 2009/0071453 A1 | 3/2009 | Stockhausen et al. |
| 2013/0101474 A1* | 4/2013 | Nakayama ......... B01D 53/9495 |
| | | 422/182 |
| 2014/0142832 A1 | 5/2014 | Pursifull |
| 2014/0305406 A1 | 10/2014 | Pursifull |
| 2017/0009670 A1 | 1/2017 | Sorge et al. |
| 2018/0320610 A1 | 11/2018 | Magnusson et al. |

FOREIGN PATENT DOCUMENTS

| | | | |
|---|---|---|---|
| JP | 2022100937 A | * | 7/2022 |
| WO | 2007087685 A1 | | 8/2007 |

\* cited by examiner

APPARATUS AND METHOD FOR REGULATING AND INJECTING GASEOUS FUEL INTO AN INTERNAL COMBUSTION ENGINE

TECHNICAL FIELD

The present application relates to an apparatus and method for pressure regulating and injecting gaseous fuel into an internal combustion engine.

BACKGROUND

Each document, reference, patent application or patent cited in this text is expressly incorporated herein in their entirety by reference, which means that it should be read and considered by the reader as part of this text. That the document, reference, patent application or patent cited in this text is not repeated in this text is merely for reasons of conciseness.

The following discussion of the background to the invention is intended to facilitate an understanding of the present invention only. It should be appreciated that the discussion is not an acknowledgement or admission that any of the material referred to was published, known or part of the common general knowledge of the person skilled in the art in any jurisdiction as at the priority date of the invention.

Gaseous fuel direct injection (GFDI) is a technique of introducing a high pressure gaseous fuel into a combustion chamber of an internal combustion engine where gaseous fuel is injected directly into the combustion chamber near the latter part of a compression stroke. Accordingly, the injection pressure of the gaseous fuel needs to be greater than the pressure in the combustion chamber (also known as in-cylinder pressure) at the time of injection. GFDI engines are typically fueled with natural gas that is stored in a liquefied form at cryogenic temperatures of around 112 Kelvin (K). A cryogenic pump pressurizes the liquefied natural gas that is fluidly communicated through a heat exchanger to vaporize and change the state of the natural gas to either a gas state or a supercritical state (determined by the pressure and the temperature of the vaporized natural gas). The gaseous fuel injection pressure employed in GFDI engines is around 300 bar. In exemplary embodiments, the cryogenic pump pressurizes the liquefied and vaporized gaseous fuel to a value between a range of 320 to 340 bar, for example, such that the vaporized natural gas can be down regulated to the final injection pressure of 300 bar. It is more efficient to pressurize the natural gas in the liquefied form than in the vaporized form since in the liquefied form the natural gas behaves like an incompressible fluid, whereas in the vaporized form, the natural gas is a compressible fluid. There is a significant energy penalty associated with pressurizing compressible fluids compared to incompressible fluids, which decreases the fuel economy of a GFDI internal combustion engine.

There is renewed interest in employing hydrogen as a fuel for internal combustion engines. Hydrogen is a carbonless fuel and accordingly does not produce carbon-based green house gases (GHG) such as carbon dioxide. Hydrogen is currently employed as a fuel in fuel cell applications where the hydrogen is stored as a compressed gas at typical maximum storage pressures of 700 bar. Hydrogen fuel cells typically operate with a hydrogen pressure of less than 5 bar such that the storage pressure of hydrogen is down regulated to this operating pressure value. The high value of the maximum storage pressure of 700 bar is selected to increase the storage density of hydrogen to extend the range of the fuel cell vehicle, since the hydrogen is stored as a compressed gas and not in its liquefied form. Currently, it is significantly more expensive to liquefy hydrogen compared to natural gas since the boiling point of hydrogen at atmospheric pressure is around 20.3 K (compared to the boiling point of natural gas of around 112 K) and its density at standard temperature and pressure (STP) (0.0899 $kg/m^3$) is low compared to the density of natural gas at STP (between 0.7 to 0.9 $kg/m^3$); that is approximately an order of magnitude denser than hydrogen. In the context of this application, standard temperature is 273.15 K (0 degrees Celsius), and standard pressure is 1 atmosphere (atm). Moreover, a gaseous fuel is any fuel that is in the gas state at standard temperature and pressure. Hydrogen and natural gas are exemplary gaseous fuels, in addition to biogas, ethane, methane, methane rich gases from fossils or renewable resources, butane, propane, ormixtures of these fuels.

The storage pressure of compressed hydrogen (CH2) decreases as the fuel is consumed in a GFDI engine. Once the storage pressure decreases below injection pressure, for example 300 bar, the hydrogen must be compressed to maintain the injection pressure as the storage pressure decreases to a lower pressure limit below which the engine cannot operate in the GFDI operating mode, at least at its optimal level. There is an energy penalty when pressurizing CH2 to injection pressure that increases significantly as the storage pressure reaches a lower pressure limit, and this parasitic energy loss decreases the fuel economy of the GFDI engine.

The state of the art is lacking in techniques for pressure regulating and injecting gaseous fuel into an internal combustion engine. The present apparatus and method provide a technique for regulating and injecting gaseous fuel into an internal combustion engine.

SUMMARY

An improved apparatus for regulating and injecting a first gaseous fuel and/or a second gaseous fuel in an internal combustion engine includes a pressure regulator and an in-cylinder fuel injector. The pressure regulator regulates a pressure of the first gaseous fuel or a pressure of the second gaseous fuel. The in-cylinder fuel injector is in fluid communication with the pressure regulator to receive the first gaseous fuel or the second gaseous fuel and directly injects the first gaseous fuel or the second gaseous fuel into a combustion chamber of the internal combustion engine. There is also a controller operatively connected with the pressure regulator and the in-cylinder fuel injector and is programmed to, when fueling the internal combustion engine with the first gaseous fuel, command the pressure regulator to regulate the pressure of the first gaseous fuel to a first injection pressure at an engine load and an engine speed; and command the in-cylinder fuel injector to inject within 90 crank angle degrees of top dead center during a compression stroke an injected quantity of the first gaseous fuel into the combustion chamber at the first injection pressure. When fueling the internal combustion engine with the second gaseous fuel, the controller is programmed to command the pressure regulator to regulate the pressure of the second gaseous fuel to a second injection pressure at the same engine load and the engine speed; and command the in-cylinder fuel injector to inject within 90 crank angle degrees of top dead center during the compression stroke an injected quantity of the second gaseous fuel (which can be the same quantity or can be a different quantity to that of the first gaseous fuel) into the combustion chamber at the second injection pressure. In an exemplary embodiment, the first gaseous fuel includes a gaseous fuel having less mole percent (mole %) hydrogen than the second gaseous fuel; the second injection pressure is less than the first injection pressure at the engine load and the engine speed by a pressure value, and the injected quantity of the first gaseous fuel and the injected quantity of the second gaseous fuel burn in a diffusion combustion mode. The pressure value between the first injection pressure and the second injection pressure can be greater than 15 bar in some embodiments, greater than 20 bar in other embodiments, and greater than 25 bar in still other embodiments and is a function of fuel constituents and/or engine operation requirements.

In another exemplary embodiment the first gaseous fuel can include one of biogas, ethane, methane, natural gas, butane, propane, or mixtures of these fuels, and the second gaseous fuel can be hydrogen.

In yet another exemplary embodiment, the first gaseous fuel contains less hydrogen by mole percent than the second gaseous fuel. The first gaseous fuel can include less than 1 mole percent (mole %) hydrogen and the second gaseous fuel can include greater than 1 mole % hydrogen. The second gaseous fuel can include at least 5 mole % hydrogen in some embodiments; or the second gaseous fuel can include greater than 15 mole % hydrogen; or greater than 25 mole % hydrogen; or greater than 40 mole % hydrogen; or greater than 50 mole % hydrogen; or greater than 70 mole % hydrogen; or greater than 90 mole % hydrogen; or can be substantially hydrogen. The pressure value is a function of a mole % of hydrogen in the second gaseous fuel; it can also be a function of a first gaseous fuel type; and/or a difference in mole % hydrogen between the second gaseous fuel and the first gaseous fuel. In some embodiments the first gaseous fuel can essentially contain 0 mole % hydrogen. In some embodiments the difference in mole % hydrogen between the second gaseous fuel and the first gaseous fuel can be 5 mole % hydrogen or greater in the second gaseous fuel than in the first gaseous fuel; or greater than 15 mole % hydrogen; or greater than 25 mole % hydrogen; or greater than 40 mole % hydrogen; or greater than 50 mole % hydrogen; or greater than 70 mole % hydrogen; or greater than 90 percent hydrogen. In some embodiments the second gaseous fuel is substantially hydrogen while in other embodiments the second gaseous fuel contains hydrogen and can further include one of biogas, ethane, methane, natural gas, butane, propane, or mixtures of these fuels.

The apparatus can further include a storage vessel for storing a gaseous fuel. A compressor can be in fluid communication with the storage vessel and operative to compress the gaseous fuel from the storage vessel. There can be a bypass valve in fluid communication with the storage vessel and selectively commanded by the controller to a bypass position to fluidly communicate the gaseous fuel from the storage vessel around the compressor, and a blocking position to fluidly communicate the gaseous fuel from the storage vessel through the compressor. The storage vessel stores the gaseous fuel as a compressed gas, and the gaseous fuel is a first gaseous fuel or a second gaseous fuel, and the in-cylinder fuel injector fluidly receives the gaseous fuel from the compressor or the bypass valve. The controller can be programmed to command the bypass valve to the bypass position to fluidly communicate the gaseous fuel around the compressor when a pressure of the gaseous fuel in the storage vessel is greater than or equal to a first injection pressure when the gaseous fuel is the first gaseous fuel. The controller can be programmed to command the bypass valve to the bypass position to fluidly communicate the gaseous fuel around the compressor when the pressure of the gaseous fuel in the storage vessel is greater than or equal to a second injection pressure when the gaseous fuel is the second gaseous fuel. The controller can be programmed to command the bypass valve to the blocking position to fluidly communicate the gaseous fuel from the storage vessel through the compressor when a pressure of the gaseous fuel in the storage vessel and/or supply pressure upstream of the compressor is less than the first injection pressure when the gaseous fuel is the first gaseous fuel. The controller can be programmed to command the bypass valve to the blocking position to fluidly communicate the gaseous fuel from the storage vessel through the compressor when the pressure of the gaseous fuel in the storage vessel and/or supply pressure upstream of the compressor is less than the second injection pressure when the gaseous fuel is the second gaseous fuel.

A sensor, such as a hot-wire sensor, can be disposed in a conduit between the storage vessel and the in-cylinder fuel injector and operatively connected with the controller. In the instance of a hot-wire sensor, when the gaseous fuel flows over the hot-wire sensor, the hot-wire sensor generates temperature signals representative of the gaseous fuel in the storage vessel, wherein the controller is programmed to receive the temperature signals and determine whether the gaseous fuel is the first gaseous fuel or the second gaseous fuel. The controller can be further programmed to determine the mole % of hydrogen in the first and/or second gaseous fuel. Alternatively, or additionally, there can be a switch operable between a first position and a second position and operatively connected with the controller that can be programmed to receive a signal from the switch where the signal represents the first gaseous fuel when the switch is in the first position and the second gaseous fuel when the switch is in the second position.

In still other embodiments the apparatus can include a first storage vessel for storing the first gaseous fuel and a first shut-off valve for selectively fluidly communicating the first gaseous fuel from the first storage vessel, a second storage vessel for storing the second gaseous fuel and a second shut-off valve for selectively fluidly communicating the second gaseous fuel from the second storage vessel, and a compressor in fluid communication with the first and second shut-off valves and operative to compress the gaseous fuel from the first and/or second storage vessels. A bypass valve can be in fluid communication with the first and/or second shut-off valves and selectively commanded by the controller to a bypass position to fluidly communicate the first or second gaseous fuel from the first or second storage vessels, respectively, around the compressor, and selectively commanded by the controller to a blocking position to fluidly communicate the first or second gaseous fuel from the first or second storage vessels, respectively, through the compressor. The controller can be programmed to command the first shut-off valve to open when fueling with the first gaseous fuel and to command the second shut-off valve to open when fueling with the second gaseous fuel. The second storage vessel can store the second gaseous fuel as a compressed gas and the in-cylinder fuel injector fluidly receives the first or second gaseous fuels from the compressor or from the bypass valve. When fueling with the second gaseous fuel, the controller can be programmed to command the bypass valve to the bypass position to fluidly communicate the second gaseous fuel from the second storage vessel around the compressor when a pressure of the second gaseous fuel in the second storage vessel is greater than or equal to the second injection pressure, and to command the bypass valve to the blocking position to fluidly communicate the second gaseous fuel from the second storage vessel through the compressor when a pressure of the second gaseous fuel in the second storage vessel and/or supply pressure upstream of the compressor is less than the second injection pressure.

The first storage vessel can store the first gaseous fuel as a liquefied gas or a compressed gas. When fueling with the first gaseous fuel, the controller can be programmed to command the bypass valve to the bypass position to fluidly communicate the first gaseous fuel from the first storage vessel around the compressor when a pressure of the first gaseous fuel in the first storage vessel and/or the supply pressure upstream of a compressor is greater than or equal to a first injection pressure, and to command the bypass valve to the blocking position to fluidly communicate the first gaseous fuel from the first storage vessel through the compressor when a pressure of the first gaseous fuel in the first storage vessel and/or supply pressure upstream of a compressor is less than the first injection pressure.

For embodiments having more than one storage vessel, the second storage vessel can store the second gaseous fuel as a liquefied gas, a compressed gas, or a cryo-compressed gas. When fueling with the second gaseous fuel, the controller can be programmed to command the bypass valve to the bypass position to fluidly communicate the second gaseous fuel from the second storage vessel around the compressor when a pressure of the second gaseous fuel in the second storage vessel and/or supply pressure upstream of a compressor is greater than or equal to the second injection pressure, and to command the bypass valve to the blocking position to fluidly communicate the second gaseous fuel from the second storage vessel through the compressor when a pressure of the second gaseous fuel in the second storage vessel and/or supply pressure is less than the second injection pressure.

An improved method for regulating and injecting a first gaseous fuel and/or a second gaseous fuel in an internal combustion engine includes, when fueling the internal combustion engine with the first gaseous fuel, regulating the pressure of the first gaseous fuel to a first injection pressure at an engine load and an engine speed, and injecting within 90 crank angle degrees of top dead center during a compression stroke an injected quantity of the first gaseous fuel into the combustion chamber at the first injection pressure, and when fueling the internal combustion engine with the second gaseous fuel, regulating the pressure of the second gaseous fuel to a second injection pressure at the engine load and the engine speed; and injecting within 90 crank angle degrees of top dead center during the compression stroke an injected quantity of the second gaseous fuel into the combustion chamber at the second injection pressure. In an exemplary embodiment the first gaseous fuel contains less hydrogen by mole % than the second gaseous fuel and the second injection pressure is less than the first injection pressure at the engine load and the engine speed by a pressure value, and the injected quantity of the first gaseous fuel and the injected quantity of the second gaseous fuel burn in a diffusion combustion mode. In another exemplary embodiment the first gaseous fuel includes a gaseous fuel other than hydrogen and the second gaseous fuel can include a range of hydrogen up to substantially 100 mole % hydrogen and the second injection pressure is less than the first injection pressure at the engine load and the engine speed by a pressure value, and the injected quantity of the first gaseous fuel and the injected quantity of the second gaseous fuel burn in a diffusion combustion mode.

An improved apparatus for regulating and injecting a gaseous fuel in an internal combustion engine includes a pressure regulator and an in-cylinder fuel injector. The pressure regulator regulates a pressure of the gaseous fuel. The in-cylinder fuel injector fluidly receives the gaseous fuel from the pressure regulator and directly injects the gaseous fuel into a combustion chamber of the internal combustion engine. There is also a controller operatively connected with the pressure regulator and the in-cylinder fuel injector and programmed to command the pressure regulator to regulate the pressure of the gaseous fuel to an injection pressure at an engine load and an engine speed and command the in-cylinder fuel injector to inject within 90 crank angle degrees of top dead center during a compression stroke an injected quantity of the gaseous fuel into the combustion chamber at the injection pressure. In an exemplary embodiment, the gaseous fuel includes hydrogen, the injection pressure equals a product of a peak cylinder pressure times a multiplication factor within a range of 1.15 and 1.4, and the injected quantity burns in a diffusion combustion mode. In other embodiments, the multiplication factor is within a range of 1.16 and 1.3, and still other embodiments the multiplication factor is within a range of 1.17 and 1.25. The gaseous fuel in some embodiments is greater than 15 mole % hydrogen; or greater than 30 mole % hydrogen; or greater than 45 mole % hydrogen; or greater than 60 mole % hydrogen; or greater than 75 mole % hydrogen; or greater than 90 mole % hydrogen. The gaseous fuel in some embodiments is substantially hydrogen.

An improved method for regulating and injecting a gaseous fuel in an internal combustion engine includes regulating a pressure of a gaseous fuel to an injection pressure at an engine load and an engine speed, and injecting within 90 crank angle degrees of top dead center during a compression stroke an injected quantity of the gaseous fuel into a combustion chamber at the injection pressure. In an exemplary embodiment the gaseous fuel includes hydrogen, the injection pressure equals a product of a peak cylinder pressure times a multiplication factor within a range of 1.15 and 1.4, and the injected quantity burns in a diffusion combustion mode. In other exemplary embodiments, the multiplication factor is within a range of 1.16 and 1.3, and in still other exemplary embodiments the multiplication factor is within a range of 1.17 and 1.25. The gaseous fuel in some embodiments is greater than 15 mole % hydrogen; or greater than 30 mole % hydrogen; or greater than 45 mole % hydrogen; or greater than 60 mole % hydrogen; or greater than 75 mole % hydrogen; or greater than 90 mole % hydrogen. The gaseous fuel in other embodiments is substantially hydrogen.

In a gaseous fueled internal combustion engine system, a gaseous fuel is stored as compressed gas in a storage vessel and a pressure sensor emits signals representative of the supply pressure in the storage vessel. A compressor is in fluid communication with the storage vessel to pressurize the gaseous fuel and a bypass valve is in fluid communication with the storage vessel to fluidly bypass the compressor when the bypass valve is in an open position. There is a gaseous-fuel rail in fluid communication with downstream sides of the compressor and the bypass valve where the gaseous fuel has an injection pressure in the gaseous-fuel rail. An in-cylinder fuel injector is in fluid communication with the gaseous-fuel rail and is operable to directly introduce the gaseous fuel into a combustion chamber of the internal combustion engine. An improved method for regulating and injecting a gaseous fuel in the internal combustion engine includes determining the supply pressure based on the signals representative of the supply pressure; determining a desired injection pressure as a function of engine load and engine speed conditions. When the supply pressure is greater than or equal to the desired injection pressure, the method includes opening the bypass valve to fluidly deliver the gaseous fuel from the storage vessel to the gaseous-fuel rail bypassing the compressor. When the supply pressure is less than the desired injection pressure, the method includes closing the bypass valve such that the compressor pressurizes the gaseous fuel from the storage vessel to the desired injection pressure. The method further includes determining injection parameters based on the injection pressure and actuating the in-cylinder injector to introduce the gaseous fuel into the combustion chamber.

An improved apparatus for regulating and injecting a gaseous fuel in an internal combustion engine having a storage vessel storing a gaseous fuel as a compressed gas; a compressor in fluid communication with the storage vessel to pressurize the gaseous fuel; a bypass valve in fluid communication with the storage vessel and actuatable between a closed position and an open position to bypass the compressor; a gaseous-fuel rail in fluid communication with an output of the compressor and an output of the bypass valve, the gaseous fuel having an injection pressure in the gaseous-fuel rail; an in-cylinder fuel injector in fluid communication with the gaseous-fuel rail and actuatable to introduce fuel directly into a combustion chamber of the internal combustion engine; a first pressure sensor emitting signals representative of a supply pressure in the storage vessel or in a supply conduit fluidly connected to the storage vessel upstream of the compressor; a second pressure sensor in fluid communication with downstream sides of the compressor and the bypass valve, the second pressure sensor emitting signals representative of a rail injection pressure of the gaseous fuel; and a controller operatively connected with the bypass valve, the in-cylinder fuel injector, the first pressure sensor, the second pressure sensor. The controller is programmed to receive the signals representative of the supply pressure and the signals representative of the rail injection pressure; determine a supply pressure of the gaseous fuel based on the signals representative of the supply pressure; determine a desired injection pressure as a function of engine load and engine speed conditions; determine a rail injection pressure of the gaseous fuel based on the signals representative of the rail injection pressure. When the supply pressure is greater than or equal to the desired injection pressure, the controller actuates the bypass valve to the open position; determines injection parameters based on at least one of the supply pressure and the rail injection pressure; and actuates the in-cylinder fuel injector to introduce fuel into the combustion chamber. When the supply pressure is less than the desired injection pressure, the controller actuates the bypass valve to the closed position whereby the compressor pressurizes the gaseous fuel to the desired injection pressure; and the controller further determines injection parameters based on the rail injection pressure; and actuates the in-cylinder fuel injector to introduce fuel into the combustion chamber. The controller can be further programmed to command the in-cylinder fuel injector to inject within 90 crank angle degrees of top dead center during a compression stroke of the engine an injected quantity of the gaseous fuel into the combustion chamber at the injection pressure. The controller can be further programmed to command the in-cylinder fuel injector to inject within 45 crank angle degrees of top dead center during a compression stroke of the engine an injected quantity of the gaseous fuel into the combustion chamber at the injection pressure. In some embodiments, a pilot fuel ignites the gaseous fuel. Some embodiments have a positive ignition source and in those embodiments the controller can be further programmed to command the in-cylinder fuel injector to inject during an intake stroke of the engine directly into a combustion chamber or within 90 crank angle degrees after bottom dead center during a compression stroke of the engine. The gaseous fuel can contain at least one of hydrogen, biogas, ethane, methane, natural gas, butane, propane, or mixtures of these fuels. In some embodiments the gaseous fuel contains greater than 5 mole % hydrogen; or greater than 15 mole % hydrogen, and in some embodiments greater than 30 mole % hydrogen. In some embodiments the gaseous fuel contains greater than 45 mole % hydrogen, and in some embodiments greater than 60 mole % hydrogen. In some embodiments the gaseous fuel contains greater than 75 mole % hydrogen; and in other embodiments greater than 90 mole % hydrogen. In some embodiments the gaseous fuel is substantially hydrogen.

An improved method for regulating and injecting a gaseous fuel in an internal combustion engine includes a gaseous fuel stored as compressed gas in a storage vessel, a first pressure sensor which emits signals representative of a supply pressure in the storage vessel or in a supply conduit fluidly connected to the storage vessel upstream of a compressor. The compressor is in fluid communication with the storage vessel to pressurize the gaseous fuel, and a bypass valve is in fluid communication with the storage vessel to fluidly bypass the compressor when the bypass valve is in an open position. A gaseous-fuel rail is in fluid communication with downstream sides of the compressor and the bypass valve, and a second pressure sensor is in fluid communication with downstream sides of the compressor and the bypass valve. The second pressure sensor emits signals representative of a rail injection pressure of the gaseous fuel. An in-cylinder injector is in fluid communication with the gaseous-fuel rail and operable to directly introduce the gaseous fuel into a combustion chamber of the internal combustion engine. The method includes determining the storage pressure and/or supply pressure based on the signals representative of the supply pressure upstream of the compressor, and determining a desired injection pressure as a function of engine load and engine speed conditions. When the supply pressure is greater than or equal to the desired injection pressure, opening the bypass valve to fluidly deliver the gaseous fuel from the storage vessel to the gaseous-fuel rail bypassing the compressor and when the supply pressure is less than the desired injection pressure, closing the bypass valve such that the compressor pressurizes the gaseous fuel to the desired injection pressure. The method further includes determining the rail injection pressure of the gaseous fuel based on the signals representative of the rail injection pressure, and determining injection parameters based on the rail injection pressure; and then actuating the in-cylinder injector to introduce the gaseous fuel into the combustion chamber. In some embodiments, the method can further include determining the mole % hydrogen in the supplied fuel and adjusting the desired injection pressure lower than a first desired injection pressure for a first gaseous fuel at the same engine load and engine speed. The first gaseous fuel containing a lower mole % of hydrogen than the fuel being supplied to the internal combustion engine. In other embodiments, the mole % hydrogen of the fuel being supplied to the internal combustion engine is known by the controller or otherwise predetermined and the desired injection pressure for an engine load and engine speed can be directly supplied from for example fuel specific look-up tables and fueling maps. In some embodiments the desired injection pressure of the gaseous fuel comprising a greater mole % hydrogen which is fueling the internal combustion engine can be adjusted lower by a pressure value based on the desired injection pressure of a gaseous fuel having less mole % or even essentially 0 mole % hydrogen for the same engine load and engine speed. In some embodiments, the method can further include injecting within 90 crank angle degrees of top dead center during a compression stroke of the engine an injected quantity of the gaseous fuel into the combustion chamber. In some embodiments, the method can further include injecting during an intake stroke of the engine directly into a combustion chamber or within 90 crank angle degrees after bottom dead center during a compression stroke of the engine.

BRIEF DESCRIPTION OF THE DRAWINGS

The accompanying drawings, which are incorporated into and constitute a part of the specification, illustrate specific embodiments of the apparatus, systems, and methods and, together with the general description above, and the detailed description of the specific embodiments, serve to explain the principles of the apparatus, systems, and methods.

DETAILED DESCRIPTION

Figure 1:
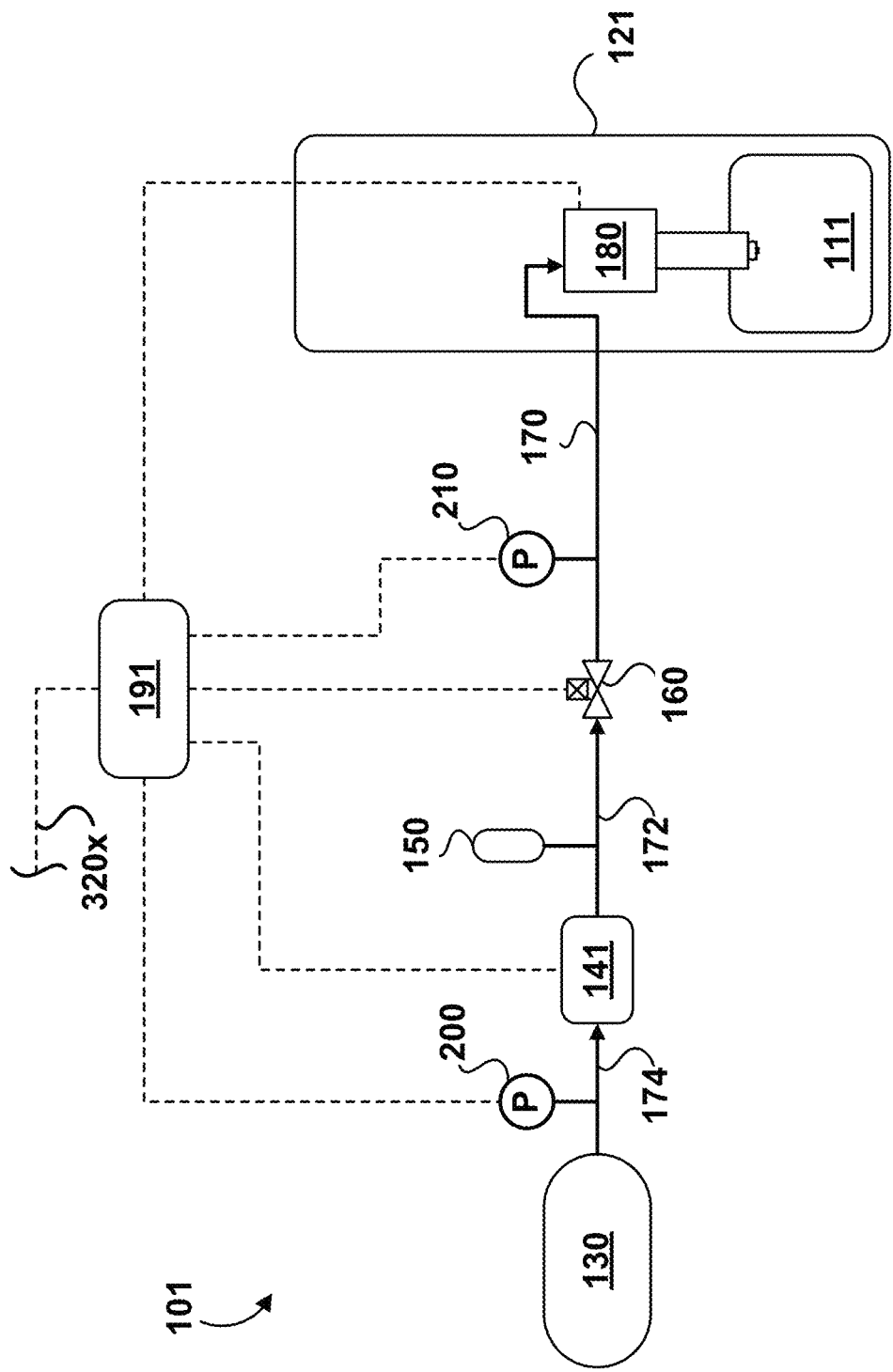
FIG. 1 is a schematic view of a fuel system for an internal combustion engine according to an embodiment.

While specific embodiments are given in the drawings and the following description, keep in mind that they do not limit the disclosure. On the contrary, these specific embodiments provide the foundation for one of ordinary skill in the art to discern the alternative forms, equivalents, and modifications that are encompassed in the scope of the appended claims. Furthermore, it should be noted that the embodiments and features of the embodiments in the present application may be combined with each other when not in conflict.

Throughout the specification and claims, the following terms take the meanings explicitly associated herein, unless the context clearly dictates otherwise. The phrases "in one embodiment," "in some embodiments", "in an exemplary embodiment," and "in some exemplary embodiments" as used herein do not necessarily refer to the same embodiment(s), though it may. Furthermore, the phrases "in other exemplary embodiments," "in an alternative embodiment," and "in some other embodiments" as used herein do not necessarily refer to a different embodiment, although it may. Thus, as described below, various embodiments of the invention may be readily combined, without departing from the scope of the invention.

The term "and/or" is used herein to mean "one or the other or both". In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references unless the context clearly dictates otherwise. The phrase "difference between X and Y" shall be interpreted as "X minus Y", while the "difference between Y and X" shall be interpreted as "Y minus X". The term "substantially," as modifying a parameter having a stated limit, is to be construed as meaning something that effectively possesses the same property or achieves the same function as that of the stated limit, and includes exactly the stated limit as well as insignificant deviations therefrom.

Various features may be grouped together in example embodiments for the purpose of streamlining the disclosure, but this method of disclosure should not be interpreted as reflecting an intention that any claimed embodiment requires more features than are expressly recited in a corresponding claim. Rather, inventive subject matter may lie in less than all features of a single disclosed example embodiment or may combine features from different figures or different embodiments. Thus, the appended claims are hereby incorporated into the detailed description, with each claim standing on its own as a separate disclosed embodiment. However, the present disclosure shall also be construed as implicitly disclosing any embodiment having any suitable set of one or more disclosed or claimed features (i.e., a set of features that are neither incompatible nor mutually exclusive) that appear in the present disclosure or the appended claims, including those sets that may not be explicitly disclosed herein or disclosed in a single figure or embodiment. Conversely, the scope of the appended claims does not necessarily encompass the whole of the subject matter disclosed herein.

Referring to FIG. 1, fuel system 101 is illustrated according to one embodiment for regulating gaseous fuel pressure and injecting gaseous fuel into combustion chamber 111 in internal combustion engine 121. Storage vessel 130 can be a pressure cylinder that stores the gaseous fuel as a compressed gas. Typical storage pressures at which refueling stations can pressurize storage vessel 130 are 300 bar and 700 bar; however, other refueling storage pressures, both higher and lower and in between, are contemplated. Pressure regulator 141 can be in fluid communication with storage vessel 130 to receive gaseous fuel at storage pressure and to regulate the pressure of gaseous fuel to injection pressure. Accumulator 150 can store a desired volume of pressurized gaseous fuel at injection pressure as a buffer against fuel demand from internal combustion engine 121, which may be a vessel or appropriately sized piping supplying fuel from pressure regulator 141. Shut-off valve 160 can be employed to isolate accumulator 150 from gaseous-fuel rail 170 and the downstream fuel system when internal combustion engine 121 is shut down. There may be a small pressure drop across shut-off valve 160 when there is a mass flow of gaseous fuel through the shut-off valve; however, this pressure drop is negligible compared to the value of the injection pressure.

Fuel injector 180 is fluidly connected with gaseous-fuel rail 170 and is operative to inject gaseous fuel directly into combustion chamber 111. In an exemplary embodiment, fuel injector 180 is hydraulically actuated to inject gaseous fuel into combustion chamber 111 later during a compression stroke of internal combustion engine 121, for example later than 90 crank angle degrees (CA°) before top dead center (TDC). Although only one such fuel injector 180 is illustrated, there can be a plurality of fuel injectors in other embodiments associated with respective combustion chambers. The gaseous fuel injected into combustion chamber 111 can be ignited using conventional ignition techniques. Electronic controller 191 is operatively connected with pressure regulator 141, shut-off valve 160 and fuel injector 180 to command their operation. Pressure sensor 200 generates signals representative of a supply pressure which is substantially the same as the storage pressure of gaseous fuel in storage vessel 130. Pressure sensor 210 generates signals representative of a delivery pressure or a rail injection pressure which is substantially the same as the injection pressure of gaseous fuel in gaseous-fuel rail 170. Electronic controller 191 is operatively connected with first and second pressure sensors 200 and 210 to receive the signals representative of supply pressure and delivery pressure, respectively, and programmed to determine the supply pressure and the delivery (rail injection) pressure accordingly. Along with pressure sensors described herein, one or more temperature sensors integrated with or separate from the disclosed pressure sensors can also be similarly employed to generate signals representative of temperature, in which case the controller is also operatively connected to the one or more temperature sensors to receive signals representative of temperature therefrom and the controller is programmed to determine the temperature of fluid flowing therethrough.

Figure 2:
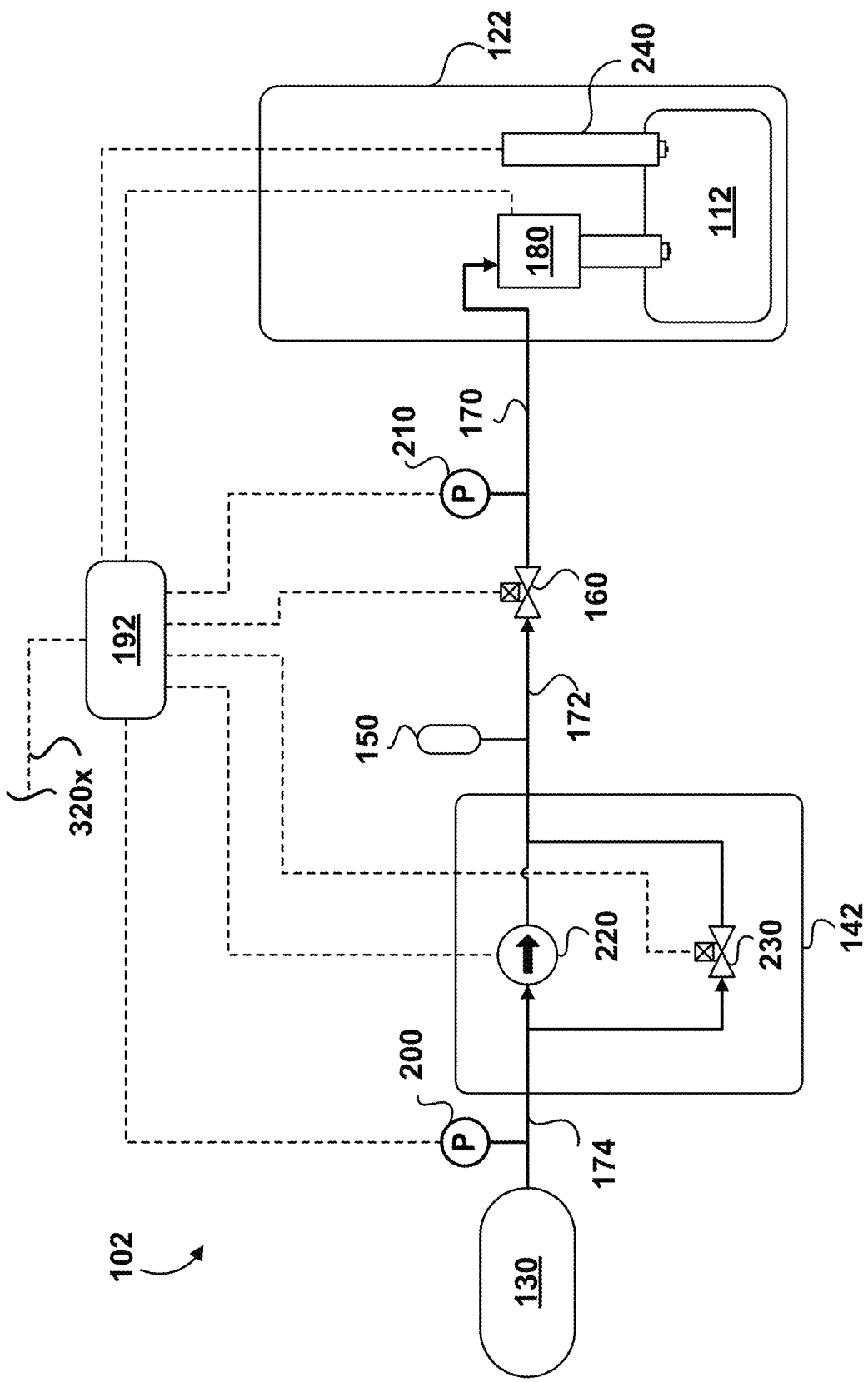
FIG. 2 is a schematic view of a fuel system for an internal combustion engine according to another embodiment.

Referring to FIG. 2, there is shown fuel system 102 according to another embodiment for regulating and injecting gaseous fuel into combustion chamber 112 in internal combustion engine 122 where like parts to the previous and other embodiments have like reference numerals and only the differences are discussed. Pressure regulator 142 includes compressor 220 and bypass valve 230 both of which are fluidly connected with storage vessel 130 to receive gaseous fuel therefrom on an input side and with accumulator 150 to supply gaseous fuel thereto on an output side. Injection pressure in gaseous-fuel rail 170 is substantially equal to storage pressure in storage vessel 130 when bypass valve 230 and shut-off valve 160 are open, where those skilled in the technology understand there may be minor pressure drops through each of the valves 160 and 230 as gaseous fuel flows therethrough. In this circumstance, the supply pressure which is also the storage pressure in storage vessel 130 is greater than or equal to a desired injection pressure such that compressor 220 does not need to pressurize the gaseous fuel from storage vessel 130. Injection pressure in gaseous-fuel rail 170 is controlled by compressor 220 when bypass valve 230 is closed, shut-off valve 160 is open and compressor 220 is pressurizing the gaseous fuel received from storage vessel 130 into accumulator 150 and gaseous-fuel rail 170. In this circumstance, compressor 220 pressurizes the gaseous fuel received from storage vessel 130 to a delivery pressure which is also the injection pressure in accumulator 150 and gaseous-fuel rail 170. Electronic controller 192 can be operatively connected with compressor 220 to command its operation, particularly when compressor 220 is electrically driven or hydraulically driven, in which case electrical switches (not shown) and mechanical valves (not shown) can be commanded by controller 192 to selectively apply electrical energy and hydraulic energy, respectively, to compressor 220. In other embodiments, compressor 220 can be driven by a camshaft or an engine power take-off from internal combustion engine 122, in which case a clutch (not shown) controlled by controller 192 can be employed to turn the compressor on and off. Electronic controller 192 commands bypass valve 230 to open or close.

Positive ignition source 240 ignites the gaseous fuel injected by fuel injector 180 into combustion chamber 112. Controller 192 is operatively connected with positive ignition source 240 to actuate the positive ignition source to create an ignition event within combustion chamber 112. Positive ignition source 240 can be a spark igniter, a heated surface such as a glow plug, a corona-discharge igniter, an induction-heating igniter, or other types of positive ignition sources.

Figure 3:
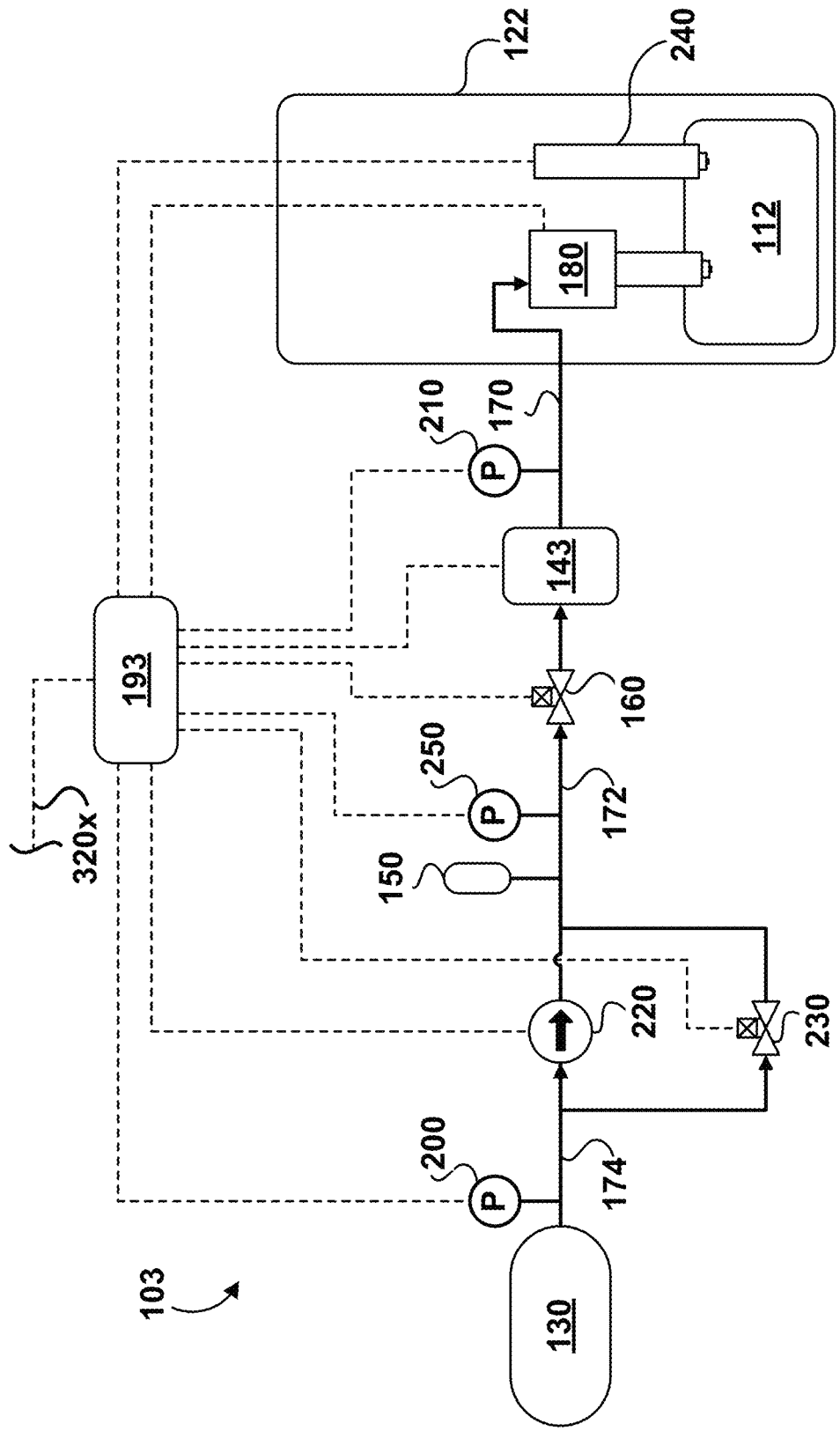
FIG. 3 is a schematic view of a fuel system for an internal combustion engine according to another embodiment.

Referring to FIG. 3, there is shown fuel system 103 according to another embodiment for regulating and injecting gaseous fuel into combustion chamber 112 in internal combustion engine 122. Pressure regulator 143 regulates a pressure of the gaseous fuel in accumulator 150 (known as accumulator pressure) to the delivery pressure which is the injection pressure found in gaseous-fuel rail 170. In an exemplary embodiment, pressure regulator 143 can be a mechanical regulator that regulates accumulator pressure to one output pressure (that is, one injection pressure). There can be one mechanical regulator in pressure regulator 143 such that there is a single injection pressure employed by fuel system 103, or there can be more than one mechanical regulator in pressure regulator 143 each with its own output pressure whereby controller 193 can select which one of these pressure regulators is enabled by selectively enabling and disabling respective shutoff valves (not shown), such that there can be two or more injection pressures. When there is only one mechanical pressure regulator 143, it may not be connected to electronic controller 193 since the pressure regulator may be designed to regulate a range of input pressures to an output pressure without the need for external control. In other embodiments, pressure regulator 143 can be an electronically controlled regulator operatively connected with and controlled by controller 193 to adjust its output pressure to two or more pressures. These electronically controlled regulators are also known as servo-controlled regulators. In other embodiments, pressure regulator 143 can be an injector controlled by electronic controller 193 to inject discrete amounts of gaseous fuel into gaseous-fuel rail 170, whereby the electronic controller monitors the pressure in gaseous-fuel rail 170 to determine whether to actuate the injector to introduce more mass in the gaseous-fuel rail. In the illustrated embodiment, when compressor 220 is disabled and bypass valve 230 is opened, pressure regulator 143 regulates gaseous fuel at supply pressure from storage vessel 130 to a delivery or injection pressure in gaseous-fuel rail 170. When compressor 220 is enabled and bypass valve 230 is disabled, pressure regulator 143 regulates gaseous fuel at accumulator pressure in accumulator 150 to delivery pressure (injection pressure) in gaseous-fuel rail 170. In this circumstance, compressor 220 pressurizes gaseous fuel at supply pressure in storage vessel 130 to gaseous fuel at accumulator pressure in accumulator 150. Pressure sensor 250 generates signals representative of the accumulator pressure of gaseous fuel in accumulator 150 and sends these signals to electronic controller 192 such that the electronic controller can determine the accumulator pressure to more intelligently command the operation of compressor 220.

Figure 4:
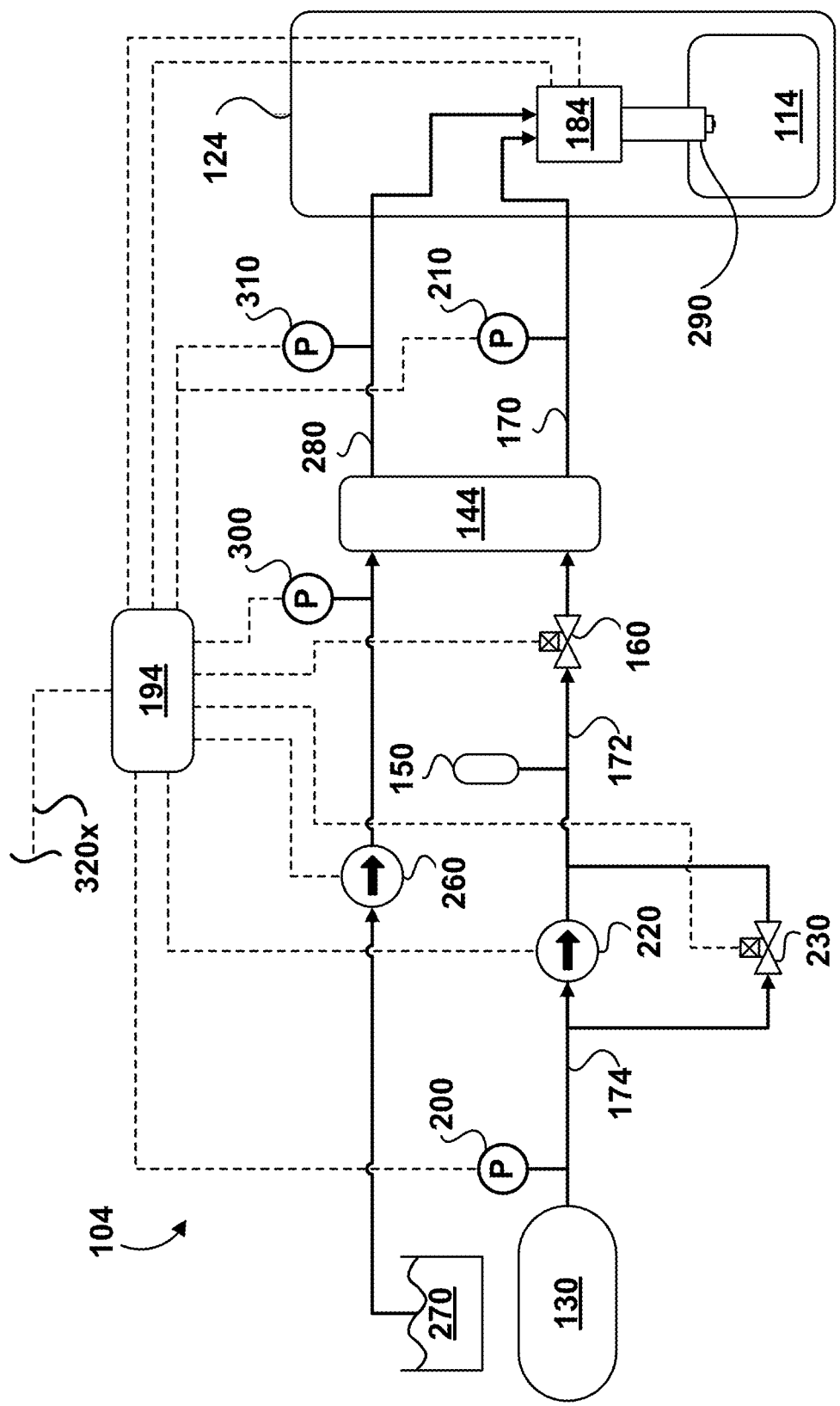
FIG. 4 is a schematic view of a fuel system for an internal combustion engine according to another embodiment.

Referring now to FIG. 4, fuel system 104 is shown according to another embodiment for regulating and injecting gaseous fuel into combustion chamber 114 in internal combustion engine 124. In the illustrated embodiment, a liquid fuel is employed as a pilot fuel to ignite the gaseous fuel in combustion chamber 114. Pumping apparatus 260 pressurizes pilot fuel from pilot-fuel storage vessel 270 and delivers the pressurized pilot fuel to pressure regulator 144. Pumping apparatus 260 can include a transfer pump located in pilot-fuel storage vessel 270, an inlet metering valve and a common rail pump, in addition to other fuel system components known to those skilled in the technology. In general, the pilot fuel is more readily ignitable than the main fuel (which is the gaseous fuel herein) for which the pilot fuel is employed to ignite. Exemplary gaseous fuels employed in conventional GFDI engines are not auto-ignitable within the pressure and temperature environment prevailing in the latter part of the compression stroke in an internal combustion engine. Accordingly, the pilot fuel such as diesel fuel can be employed as an ignition source to ignite the gaseous fuel. The pilot fuel can be injected during the compression stroke into a pressure and temperature environment that causes the pilot fuel to auto-ignite and combust thereby creating another pressure and temperature environment suitable for igniting the gaseous fuel. In an exemplary embodiment the pilot fuel is injected later in the compression stroke such that the pilot fuel burns in a diffusion combustion mode. The gaseous fuel can be injected before, during and/or after the injection of the pilot fuel. In other embodiments the pilot fuel can be another gaseous fuel that is more readily ignitable than the main gaseous fuel such that the second gaseous fuel can be ignited by the pressure and temperature environment existing during the compression stroke, and more particularly in the later part of the compression stroke in an internal combustion engine. Returning to FIG. 4, pressure sensor 300 generates signals representative of pilot fuel pressure downstream from pumping apparatus 260 and upstream of pressure regulator 144, and these signals are sent to electronic controller 194 that determines pilot fuel pressure in this location.

Pressure regulator 144 is employed to maintain a differential pressure between pilot fuel pressure in pilot-fuel rail 280 and gaseous fuel pressure in gaseous-fuel rail 170 within a desired range (where pilot fuel pressure is greater than gaseous fuel pressure by at least a desired margin), such that the pilot fuel can be employed as a hydraulic fluid in the actuation of dual fuel injector 184 and in forming liquid seals to seal the gaseous fuel within dual fuel injector 184. The differential pressure is also known as system bias pressure. U.S. Pat. No. 6,298,833, issued on Oct. 9, 2001, and owned by the Applicant, discloses various embodiments of exemplary pressure regulators 144 that can be employed herein, although other techniques for maintaining a pressure bias between two fuels can also be employed. These techniques are known generally as either gas-follows-diesel (GFD) and diesel-follows-gas (DFG), in which the first listed fuel refers to the fuel whose pressure is regulated based on the pressure of the second listed fuel. Pressure sensor 310 generates signals representative of pilot fuel pressure downstream from pressure regulator 144 in pilot-fuel rail 280, and these signals are sent to electronic controller 194 such that the electronic controller can determine pilot-fuel pressure in this location. Pressure regulator 144 can mechanically regulate one fuel pressure based on the other fuel pressure. In other embodiments, a separate electronically controlled gaseous fuel pressure regulator can regulate the gaseous fuel pressure independently but correlated with the pilot fuel rail pressure, in which case the electronically controlled gaseous fuel pressure regulator is operatively connected with and controlled by controller 194. Dual fuel injector 184 is fluidly connected with pilot-fuel rail 280 and gaseous-fuel rail 170 and is operative to separately and independently inject the pilot fuel and the gaseous fuel through nozzle 290 into combustion chamber 114, where nozzle 290 of dual fuel injector 184 is disposed. In other embodiments when the pilot fuel is another type of gaseous fuel a separate hydraulic fluid can perform the actuating and sealing functions that is otherwise performed by the liquid pilot-fuel. Rather than a dual fuel injector, a separate gaseous fuel injector and pilot fuel injector is also contemplated in engine systems where space allows to separately inject the gaseous fuel and pilot fuel respectively. Electronic controller 194 is operatively connected with pumping apparatus 260 and fuel injector 184 to command their operation. The pressure of the pilot fuel in pilot-fuel rail 280 is also known as pilot-fuel injection pressure, and as disclosed in previous embodiments the pressure of the gaseous fuel in gaseous-fuel rail 170 is known as gaseous-fuel injection pressure (which is substantially the delivery pressure of the gaseous fuel delivered to injector 184).

Figure 5:
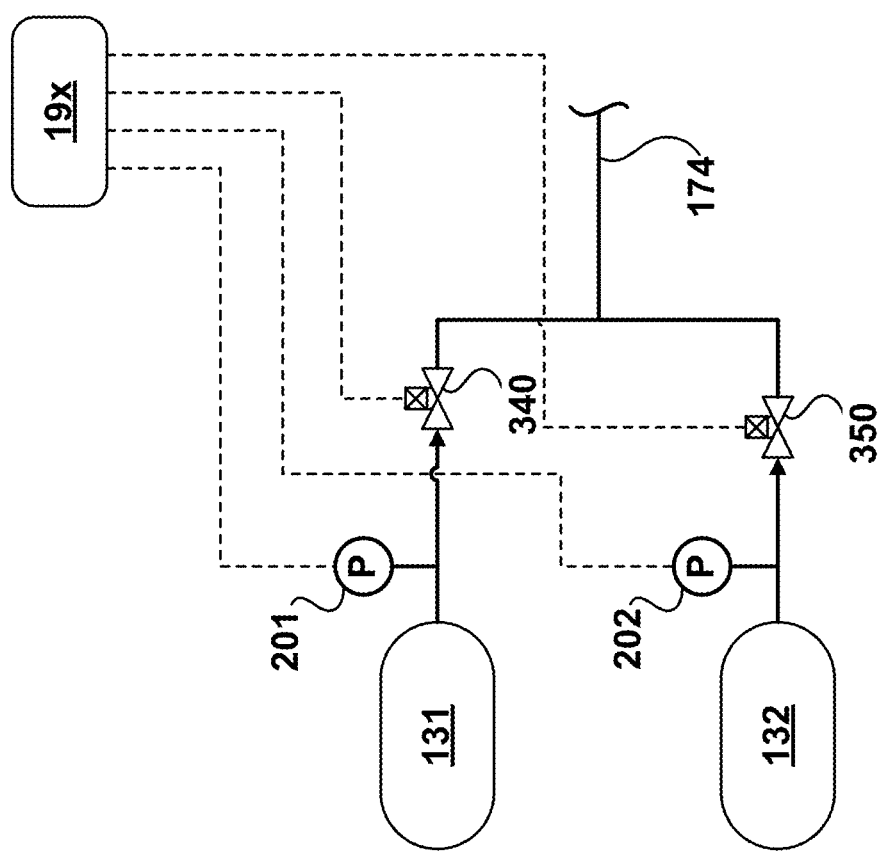
FIG. 5 is a schematic view of an alternative arrangement for storing two types of gaseous fuel that can be employed in the fuel systems of FIGS. 1, 2, 3, and 4.

In other embodiments two or more storage vessels can be employed where each storage vessel stores a type of gaseous fuel. With reference to FIG. 5, storage vessel 131 stores the first gaseous fuel as a compressed gas and storage vessel 132 stores the second gaseous fuel also as a compressed gas, and these storage vessels can be employed instead of storage vessel 130 in fuel systems 101, 102, 103, and 104 in FIGS. 1, 2, 3, and 4, respectively. The electronic controller with reference numeral 19x in FIG. 5 is representative of one of the electronic controllers 191, 192, 193, and 194 on FIGS. 1, 2, 3, and 4, respectively. Electronic controller 19x commands one of shut-off valves 340 and 350 to open to allow the first gaseous fuel and the second gaseous fuel to flow from storage vessel 131 and 132, respectively, to conduit 174. Pressure sensors 201 and 202 generate signals representative of the supply pressure of gaseous fuel in storage vessels 131 and 132 respectively. In some embodiments, electronic controller 19x intrinsically knows whether internal combustion engines 121, 122, and 124 are fueled with the first gaseous fuel or the second gaseous fuel based on for example a set positional arrangement of the first storage vessel 131 and second storage vessel 132. In other embodiments, electronic controller can receive either an analog or digital signal indicating which storage vessel contains the first gaseous fuel and which storage vessel contains the second gaseous fuel.

Figure 6:
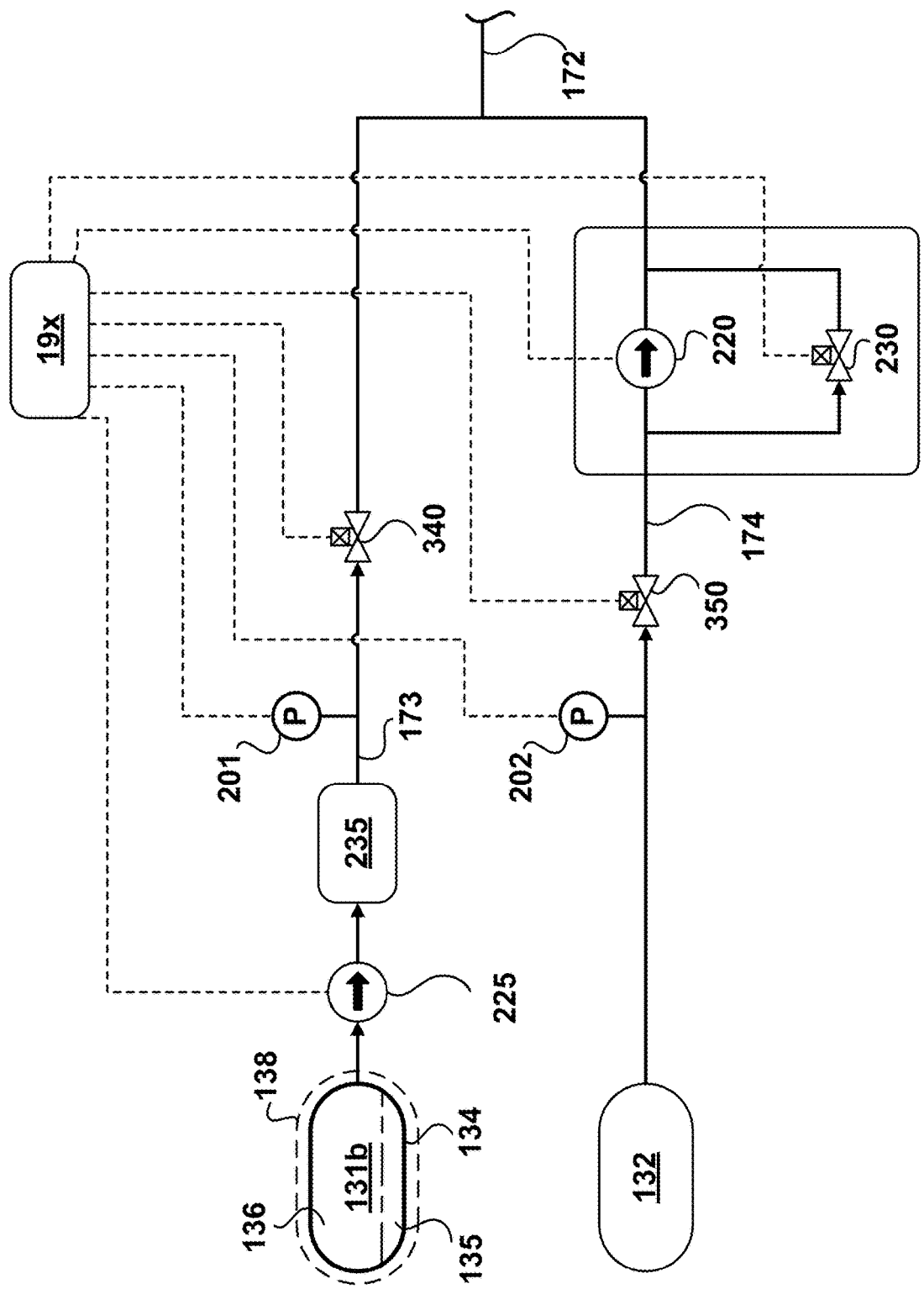
FIG. 6 is a schematic view of an alternative arrangement for storing two types of gaseous fuel that can be employed in the fuel systems of FIGS. 1, 2, 3, and 4.

With reference to FIG. 6, alternatively to storing the first gaseous fuel as a compressed gas, storage vessel 131b stores the first gaseous fuel in liquefied form. Depending on the vessel and the gaseous fuel, the liquified gaseous fuel can be stored at ambient to very low temperatures (including cryogenic temperatures <130K) and at low pressures (at or near atmospheric pressure) to high pressures (>200 bar). For storing at cryogenic temperatures, generally a vessel has an inner vessel (134) for holding the cryogenic fluid and an outer vessel (138) with an insulative space therebetween which extends holding time. When inner vessel 134 is reinforced for higher pressure fluid containment, such as a cryo-compressed vessel arrangement, the fluid can be stored at cryogenic temperatures and high pressures (up to 500 bar). As an example of a gaseous fuel stored in liquified form at cryogenic temperatures and low pressures, the first gaseous fuel in storage vessel 131b can be natural gas stored in liquefied form around a temperature of 112 K and at or near 1 atmosphere. When the liquified gaseous fuel is stored at or near ambient pressure, cryogenic pump 225 can be employed to pressurize the first gaseous fuel and vaporizer 235 changes the state of the pressurized fuel from the liquid state to either the gas state or supercritical state (depending upon the temperature and pressure of the vaporized gaseous fuel). Although cryogenic pump 225 and vaporizer 235 are illustrated external to storage vessel 131b, in other embodiments, cryogenic pump 225 and vaporizer 235 can be disposed at least partially within storage vessel 131b. Since gaseous fuels in the liquid state are easier to compress than gaseous fuels in the gas state thus requiring less energy to compress, the first gaseous fuel in this particular example does not need to be compressed by compressor 220, and instead is only pressurized by cryogenic pump 225, such that a downstream side of shut-off valve 340 can be directly fluidly connected to delivery conduit 172 (that is downstream of compressor 220) instead of conduit 174 (that is upstream of compressor 220).

Storage vessels disclosed herein can be individual storage vessels fueled with a first gaseous fuel and later refueled with a second gaseous fuel different from the first gaseous fuel at least in the mole % amount of hydrogen gas in which it contains. When more than one storage vessel is being employed, each vessel can be designated for a type of gaseous fuel; in that a first storage vessel stores a first gaseous fuel and a second storage vessel stores a second gaseous fuel different at least in the mole percent amount of hydrogen gas in which it contains; or a determination of the type of fuel stored within each vessel can be set and/or otherwise inputted into the controller, at for example the time of filling of the storage vessel or ascertained onboard during an engine fueling operation. The mole percent hydrogen in a fuel is equivalent to the volume percent hydrogen in the fuel when at standard pressure and temperature. Separate vessels storing a first gaseous fuel and a separate second gaseous fuel can be arranged independent of each other or arranged together in an integrated manner with for example, an outer vessel enshrouding two inner storage vessels as described in co-owned U.S. Pat. No. 7,850,034 which discloses multi-fuel storage arrangements in which two gaseous fuels are stored in separate insulative spaces within a single outer vessel shroud to further insulate and increase storage density of both gaseous fuels therein. Depending on the storage vessel employed, the gaseous fuel can also be stored in liquefied, compressed, and/or cryo-compressed form. As with storage vessel 131b in FIG. 6, depending on the vessel specifications and the gaseous fuel, the gaseous fuel is stored at ambient to very low temperatures (including cryogenic temperatures <130K) and a range of pressures from low pressures (near atmospheric pressure) to high pressures (>200 bar).

Figure 7A:
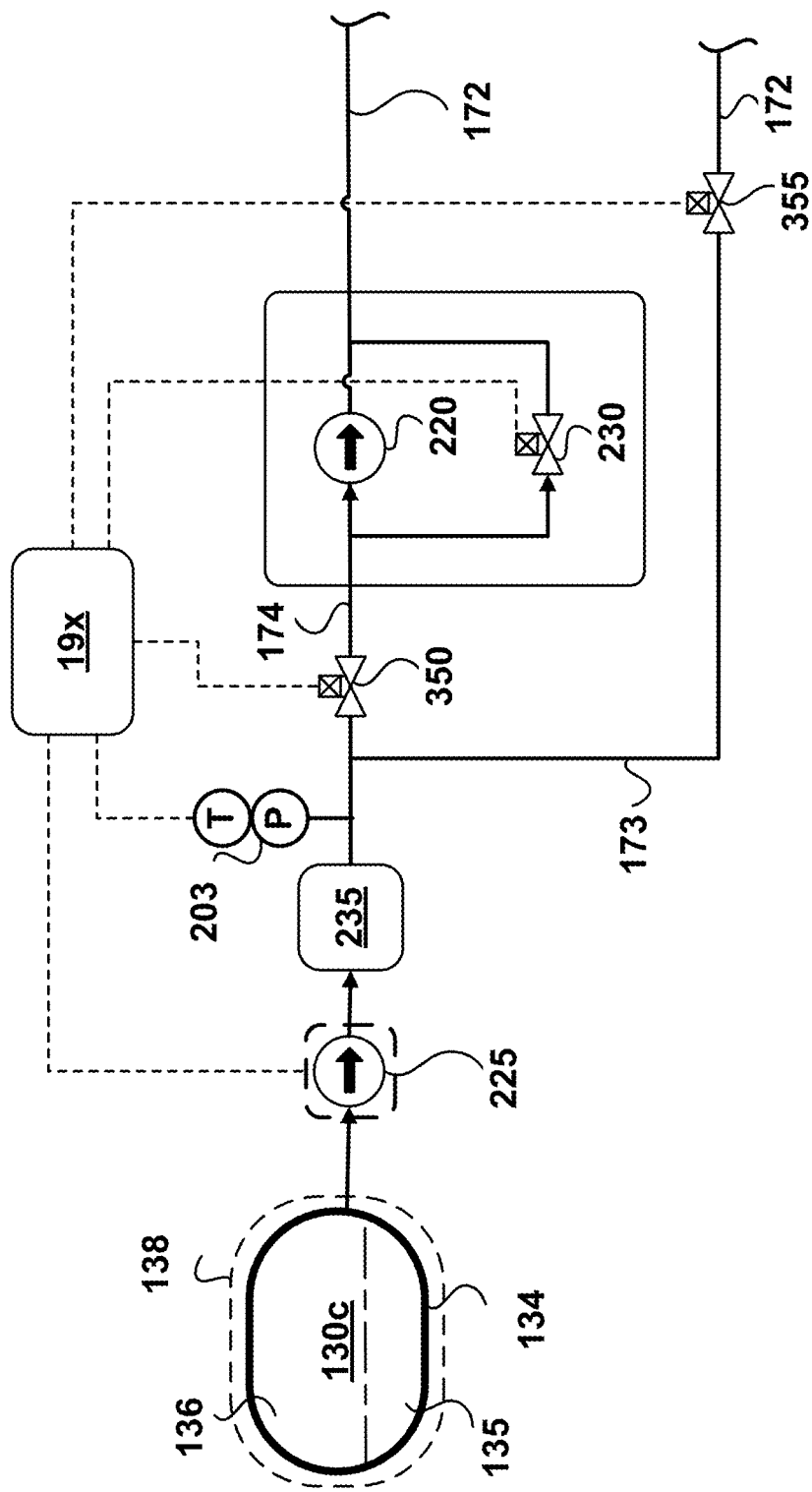
FIG. 7a is a schematic view of an alternative arrangement for storing gaseous fuel that can be employed in the fuel systems of FIGS. 1, 2, 3, and 4.

With reference to FIGS. 7a, 7b, 7c and 7d, and as an example of a gaseous fuel stored at very low temperature and high pressure, hydrogen can be stored in cryo-compressed form and pressurized nominally to 250-350 bar pressures although such vessels are capable of storing hydrogen (and other gaseous fuels) at a range of temperatures from cryogenic to ambient temperatures and pressures ranging up to 500 bar. Referring to FIG. 7a, cryogenic pump 225 may be optionally employed to raise the pressure of the gaseous fluid exiting storage vessel 130c to a higher pressure; however in other embodiments the gaseous fuel exiting storage vessel 130c flows directly to vaporizer 235 which increases the enthalpy of the pressurized fuel and depending upon the supply pressure of the gaseous fuel, as indicated by pressure sensor 203, the gaseous fuel can be supplied directly to delivery conduit 172 (FIGS. 7a and 7d) and to gaseous-fuel rail 170 through supply conduit 173. Note, when both supply conduits 173 and 174 are present, shut-off valves 350 and 355 can be employed such that controller 19x commands valve 355 to an open position allowing fluid flow therethrough from supply conduit 173 to delivery conduit 172 and commands shut-off valve 350 to a closed position blocking fluid through supply conduit 174 to delivery conduit 172. Alternatively, or in addition to employing pump 225, the pressure of the gaseous fuel exiting storage vessel 130c can be raised employing compressor 220, downstream of vaporizer 235 (and vaporizer 237 in FIG. 7c), by directing fluid through supply conduit 174 to compressor 220. In embodiments where compressor 220 is employed instead of or in addition to cryogenic pump 225 for increasing the pressure of the gaseous fuel, pressure sensor 203 generates signals representative of the supply pressure exiting vaporizer 235 (and vaporizer 237, FIG. 7c) upstream of compressor 220 and when the gaseous supply pressure is greater than or equal to a desired injection pressure, compressor 220 does not need to pressurize the gaseous fuel from storage vessel 130c and bypass valve 230 is selectively commanded by the controller 19x to a bypass position to fluidly communicate the gaseous fuel from the storage vessel around compressor 220; and when the gaseous fuel supply pressure upstream of compressor 220 is less than a desired injection pressure, bypass valve 230 is selectively commanded to a blocking position to fluidly communicate the gaseous fuel from storage vessel 130c (and vaporizer 235, 237) through compressor 220. Again, when both supply conduits 173 and 174 are present, shut-off valves 350 and 355 can be employed and controller 19x commands shut-off valve 350 to an open position allowing fluid flow therethrough in supply conduit 174 and commands shut-off valve 355 to a closed position blocking fluid through supply conduit 173 to delivery conduit 172. Rather than employing shut-off valves 350 and 355, a switching device such as a three-way valve can be employed upstream of compressor 220 to selectively control gaseous fuel flowing from storage vessel 130c through supply conduit 173 and/or 174 and on to delivery conduit 172 and gaseous-fuel rail 170.

In some embodiments, a single storage vessel can be employed to store and selectively supply a first and a second gaseous fuel to engines 121, 122 and 124 in fuel systems 101, 102, 103, and 104 shown in FIGS. 1, 2, 3, and 4, respectively. In an exemplary embodiment and with reference in particular to FIGS. 7b, 7c and 7d, storage vessel 130c can store a first gaseous fuel, a second gaseous fuel, or both gaseous fuels simultaneously in a single storage vessel and selectively and independently supply the two gaseous fuels to delivery conduit 172 through separate conduits (176 and 178) which are both fluidly connected to storage vessel 130c. For example, a cryo-compressed storage vessel can hold the first and second gaseous fuels at a pressure and temperature in which the first gaseous fuel is in a liquified state and the second gaseous fuel is in a vapor state. An outer vessel enshrouding two inner storage vessels as described in co-owned U.S. Pat. No. 7,850,034 discloses multi-fuel storage arrangements in which two gaseous fuels are stored in separate insulative spaces within a single outer vessel shroud to further insulate and increase storage density of both gaseous fuels therein. In another exemplary embodiment, storage vessel 130c can store liquified natural gas as the first gaseous fuel in lower portion 135 of storage vessel 130c and stores the second gaseous fuel as a mixture of natural gas and hydrogen in the form of vapor in upper portion 136 of storage vessel 130c. Depending on pressure and temperature in vessel 130c, the mole % natural gas and mole % hydrogen in the vapor mixture will vary when both fuels are stored together within the same space in vessel 130c; that is, the two gaseous fuels are stored in the same space rather than separated by for example, multiple inner vessels, or a storage vessel having selectively permeable structures, such as a membrane that allow hydrogen to pass therethrough to a separated space therein but does not allow larger hydrocarbons such as methane to pass through. Hydrogen has a much lower specific density than natural gas (primarily methane) and liquifies at a much lower temperature and at higher pressure than natural gas and can be stored in vapor form in the same vessel storing natural gas in liquified form.

Figure 7B:
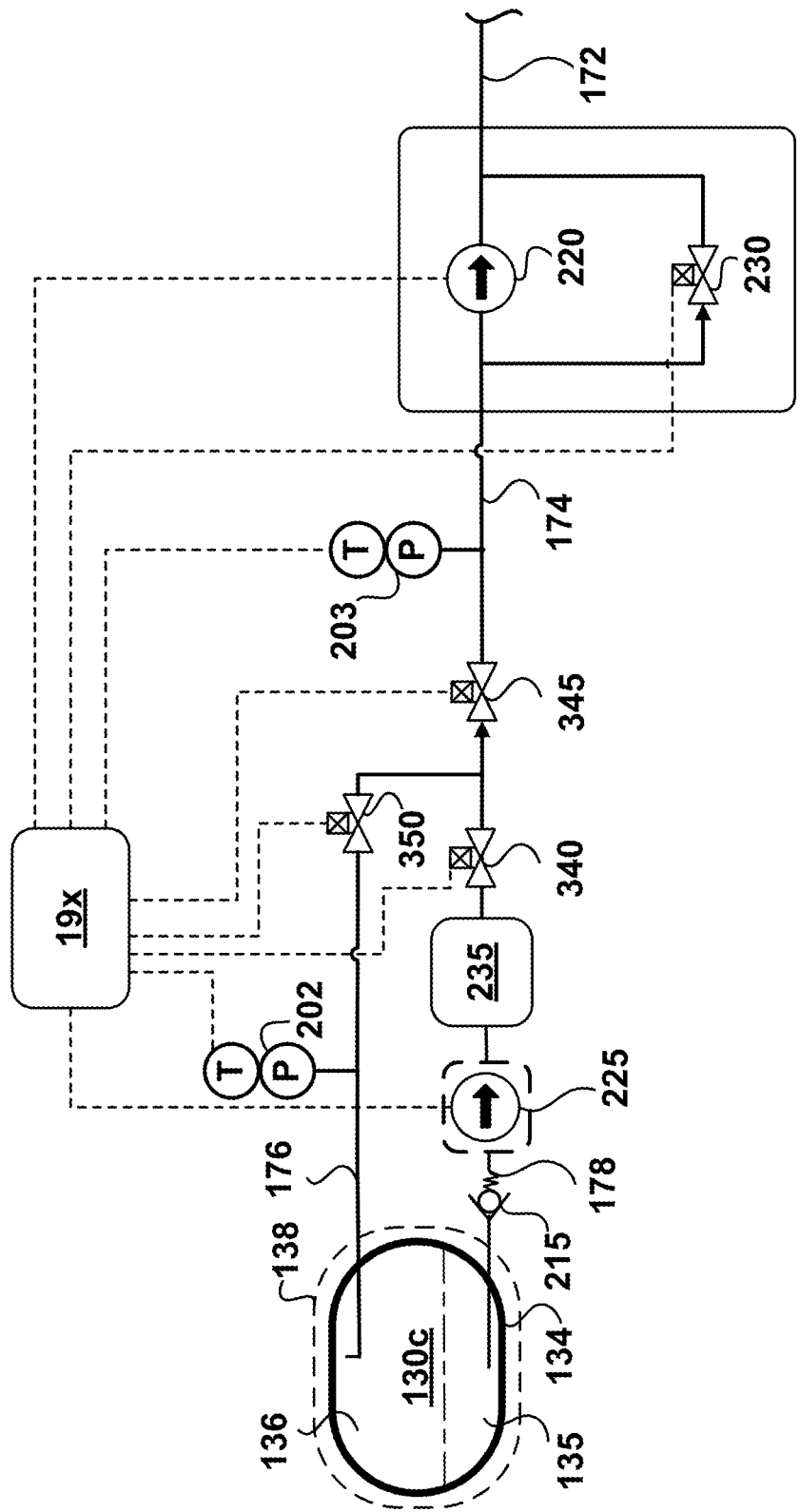
FIG. 7b is a schematic view of an alternative arrangement for storing gaseous fuel that can be employed in the fuel systems of FIGS. 1, 2, 3, and 4.
Figure 7C:
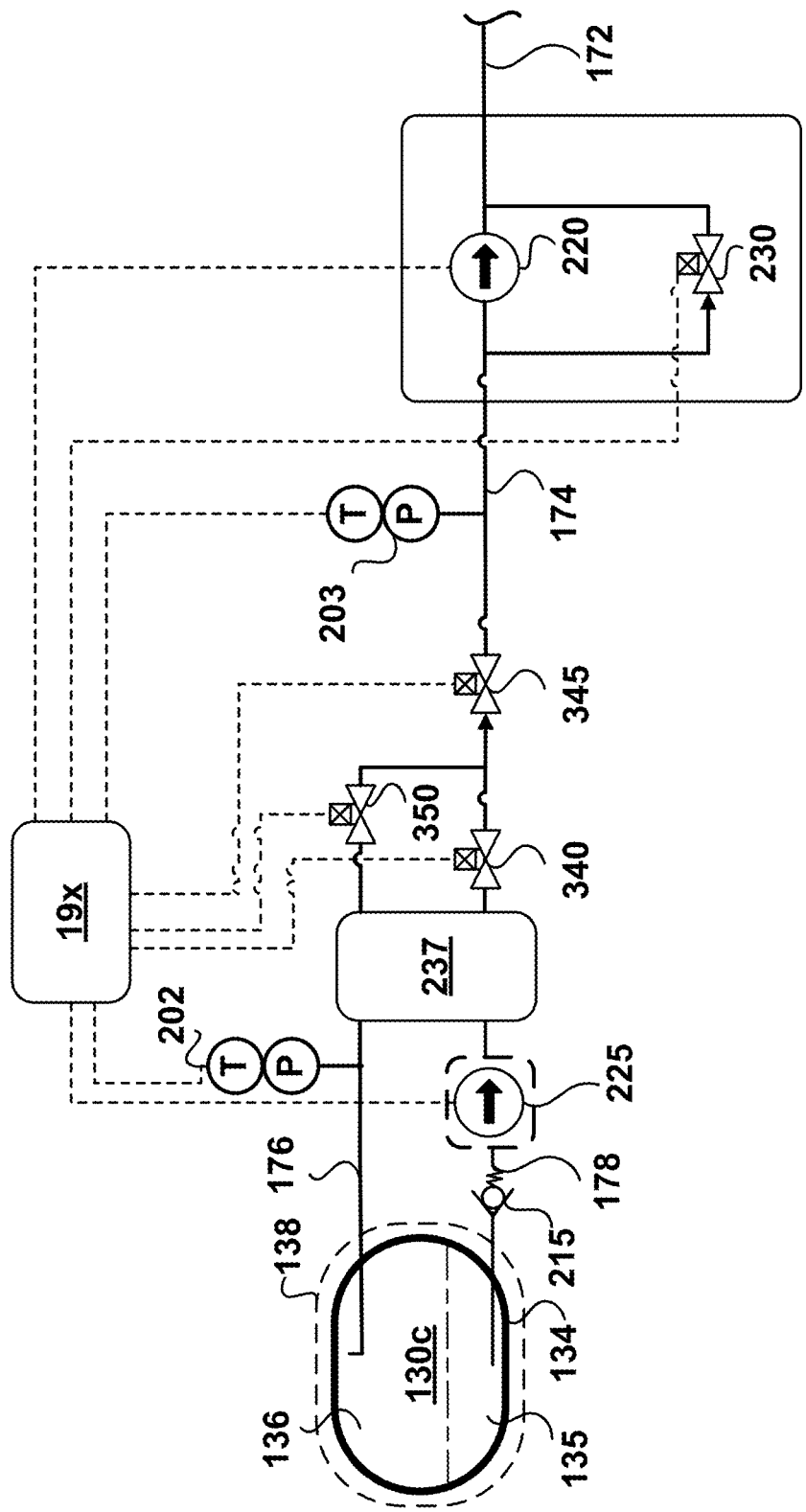
FIG. 7c is a schematic view of an alternative arrangement for storing gaseous fuel that can be employed in the fuel systems of FIGS. 1, 2, 3, and 4.
Figure 7D:
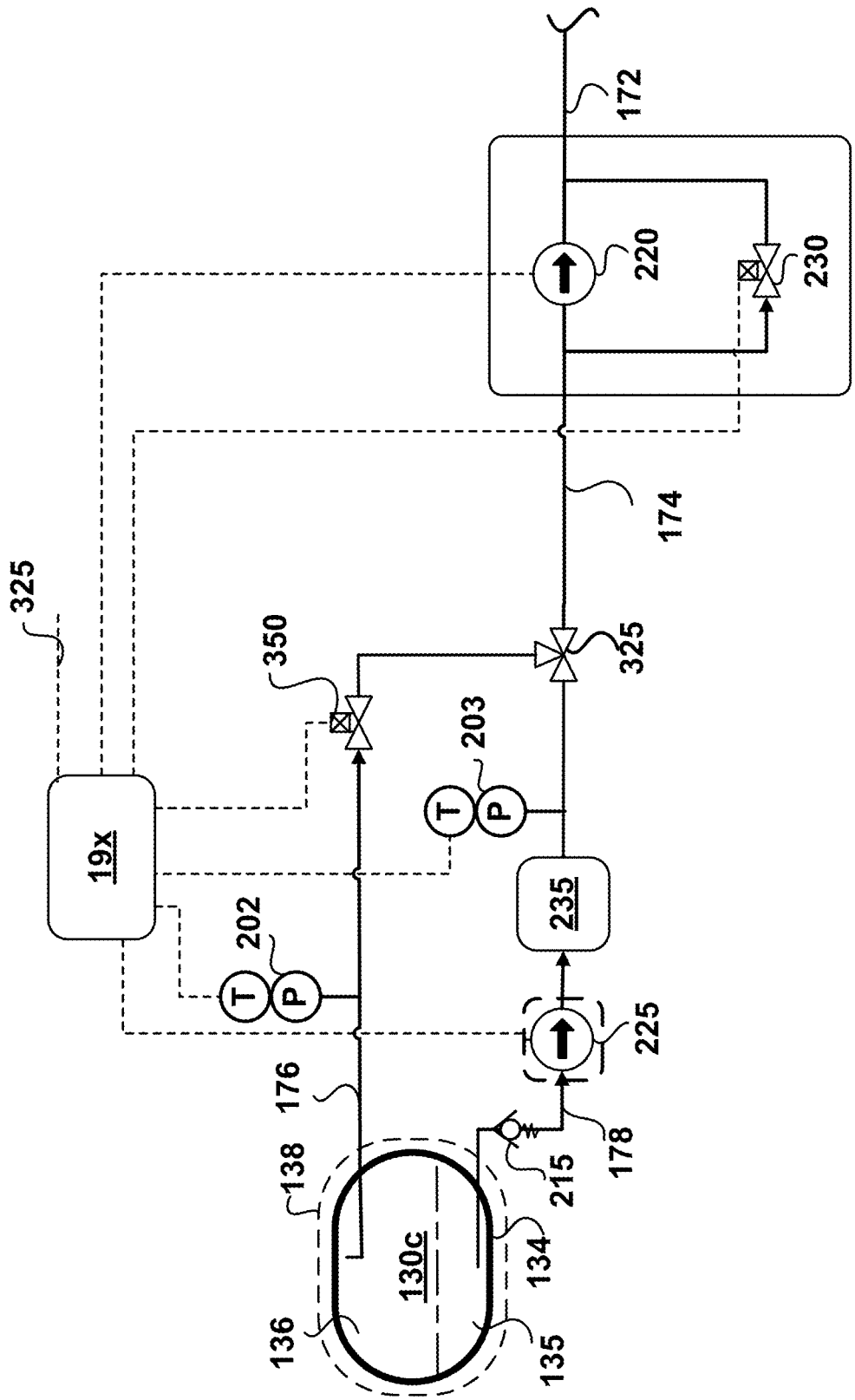
FIG. 7d is a schematic view of an alternative arrangement for storing gaseous fuel that can be employed in the fuel systems of FIGS. 1, 2, 3, and 4.

In exemplary embodiments in which both the first gaseous fuel and the second gaseous fuel are stored simultaneously in the same storage space of a storage vessel, the first gaseous fuel, in the form of a liquified gaseous fuel (such as liquified natural gas), is supplied from lower portion 135 of storage vessel 130c through conduit 178 to vaporizer 235. An optional cryogenic pump 225 can be employed to pressurize the first gaseous fuel before vaporizer 235 changes the state of the pressurized fuel from the liquid state to either the gas state or supercritical state (depending upon the temperature and pressure of the vaporized gaseous fuel). Alternatively, or in addition to employing pump 225, the pressure of first gaseous fuel can be raised employing a compressor downstream of vaporizer 235. The second gaseous fuel, in the form of vapor, is supplied from upper portion 136 of storage vessel 130c through conduit 176. Pressure sensor 202 generates signals representative of the storage pressure 130c. When fueling engine with gaseous fuel supplied from storage vessel 130c through conduit 176, shut-off valves 350 and 345 (valves 350 and 325 in FIG. 7d) are commanded to an open flow position to allow second gaseous fuel flow from conduit 176 to conduit 174 upstream of compressor 220. Note, check valve 215, a one-way valve on conduit 178, is provided such that fluid flows out of storage vessel 130c through liquified gaseous fuel conduit 178 but does not allow fluid flow in the opposite direction back into storage vessel 130c from conduit 178. A check valve or other selectively directional flow valve such as shut-off valve 340 (FIGS. 7b and 7c) or three-way valve 325 (FIG. 7d) can also be employed after vaporizer 235 to similarly block fluid flowing from conduit 176 and 174 through vaporizer 235 to liquified gaseous fuel conduit 178. As best seen in FIGS. 7b and 7c, when fueling engine with gaseous fuel supplied from storage vessel 130c through conduit 178, shut-off valve 350 can be commanded to a closed position and shut-off valve 340 (and 345 if present) is commanded to an open position to allow gaseous fuel flow from conduit 178 to supply conduit 174 upstream of compressor 220. In embodiments having a switching device such as three-way valve 325 (FIG. 7d), three-way valve is commanded to a flow position to allow gaseous fuel flow from liquified gaseous fuel conduit 178 to supply conduit 174 through vaporizer 235 (and optional pump 225) and blocks flow from conduit 178 (and 174) to conduit 176. Shut-off valve 350, when present, can also be commanded to a closed position to block fuel flow from conduit 178 to conduit 176. Pressure sensor 203 and/or sensor 202 generates signals representative of the supply pressure in supply conduit 174 upstream of compressor 220 and when the first or second gaseous supply pressure is greater than or equal to a desired injection pressure for first or second gaseous fuel respectively, compressor 220 does not need to pressurize the gaseous fuel and bypass valve 230 is selectively commanded by the controller to a bypass position to fluidly communicate the first or second gaseous fuel from storage vessel 130c around compressor 220 to delivery conduit 172; and when the first or second gaseous fuel pressure is less than a desired injection pressure for first or second gaseous fuel respectively, bypass valve 230 is selectively commanded to a blocking position to fluidly communicate the first or second gaseous fuel from vessel 130c through compressor 220 to further pressurize the gaseous fuel.

It is noted that in FIG. 7b, gaseous fuel supplied from the vapor space, upper portion 136 of storage vessel 130c, fluidly connects to conduit 174 downstream of vaporizer 235 and upstream of compressor 220. Alternatively, as shown FIG. 7c, gaseous fuel supplied from the vapor space, upper portion 136 of storage vessel 130c, can first fluidly flow through vaporizer 237 which increases the enthalpy of the pressurized gaseous fuel to a desired fueling temperature for fueling the internal combustion engine. In FIG. 7c, vaporizer 237 integrates a first vaporizer (such as vaporizer 235) and a second vaporizer in a single housing; however two separately housed vaporizers can alternately be employed depending on for example space and other system constraints.

In embodiments where compressor 220 is employed by both first and second gaseous fuels, an optional switching device 325 (shown in FIG. 7d as three-way valve 325), fluidly connects the outlet of vaporizer 235 (or both gaseous fuel outlets of vaporizer 237) with conduit 174 upstream of compressor 220. Switching device 325 can be a manual valve or controller 19x can command switching device 325 to a position that allows fluid flowing from vaporizer 235 to conduit 174 upstream of compressor 220. Pressure sensor 203 generates signals representative of the supply pressure exiting vaporizer 235 (and vaporizer 237) and when the gaseous pressure is greater than or equal to a desired injection pressure, compressor 220 does not need to pressurize the gaseous fuel and bypass valve 230 is selectively commanded by the controller to a bypass position to fluidly communicate the gaseous fuel from vaporizer 235 around compressor 220 to delivery conduit 172; and when the gaseous fuel pressure exiting vaporizer 235 is less than a desired injection pressure, bypass valve 230 is selectively commanded to a blocking position to fluidly communicate the gaseous fuel from vaporizer 235 through compressor 220 to further pressurize the first gaseous fuel.

Similar to FIG. 5, the electronic controller with reference numeral 19x in FIGS. 6, 7a, 7b, 7c and 7d is representative of one of the electronic controllers 191, 192, 193, and 194 of FIGS. 1, 2, 3, and 4, respectively. Electronic controller 19x commands one or more of shut-off valves 340, 345, 350 and 355 to open to allow the gaseous fuel to flow from the respective vessel 130c, 131b and 132, to conduit 172. Pressure sensor 203 generates signals representative of the supply pressure of gaseous fuel in supply conduit 173 and 174 downstream of vaporizer 235, while pressure sensor 202 generates signals representative of the storage pressure of gaseous fuel in storage vessel 132 which can also be the supply pressure upstream of compressor 220 (FIG. 5) when shut-off valve 350 is in the open position. Pressure sensor 203 generates signals representative of the supply pressure of gaseous fuel in supply conduit 173 downstream of vaporizer 235 (FIG. 7a) and in supply conduit 174 downstream of vaporizers 235 and 237 (in FIGS. 7b, 7c, 7d).

Referring back to FIGS. 1, 2, 3, and 4, signal 320x in fuel systems 101, 102, 103, and 104 is representative of the type of gaseous fuel that is currently being supplied to internal combustion engines 121, 122, and 124. Signal 320x is received by electronic controllers 191, 192, 193, and 194 and can be a digital signal or an analog signal. With reference to FIG. 8a, in one embodiment signal 320x can be signal 320a generated by fuel-type switch 330 operated by a user into either a first position (representative of a logic zero) or a second position (representative of a logic one), where the first position represents a first gaseous fuel and in the second position represents a second gaseous fuel. In other embodiments, there can be more than one digital signal 320a whereby more than two types of gaseous fuel can be selected, where the switch can be, for example, a rotary switch having three or more positions. Instead of employing fuel-type switch 330, a user can input or select a type of gaseous fuel through a user interface (not shown) of electronic controllers 191, 192, 193, and 194. In embodiments where multiple signals are received by electronic controllers 191, 192, 193, and 194, indicating the type of first and/or second gaseous fuels, the electronic controller may employ advanced signal control to provide signal prioritization or signal preemption.

Figure 8B:
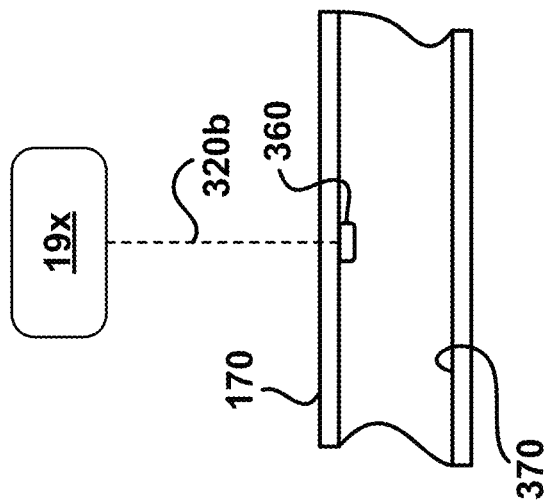
FIG. 8b is a schematic view of a hot-wire sensor configured in a gaseous-fuel conduit for detecting fuel type in the fuel systems of FIGS. 1, 2, 3, and 4.
Figure 8A:
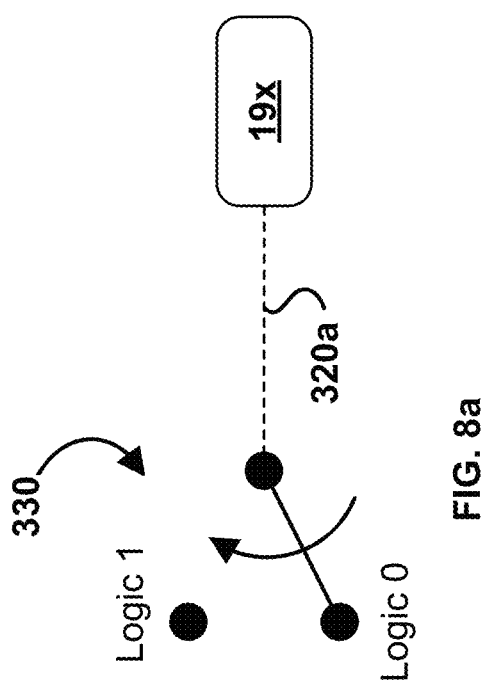
FIG. 8a is a schematic view of a fuel-type switch for the fuel systems of FIGS. 1, 2, 3, and 4.

With reference to FIG. 8b, in another embodiment signal 320x can be signal 320b generated by hot-wire sensor 360 secured to inner surface 370 of gaseous-fuel rail 170. Instead of gaseous-fuel rail 170, hot-wire sensor 360 can be secured within conduits 174 or 172 and in general in any conduit between storage vessels 130, 130c, 131, 131b, and 132 and injectors 180 and 184. The gaseous fuel flowing over hot-wire sensor cools the sensor and the amount of cooling for a given engine load and engine speed condition is a function of the type of gaseous fuel. Signal 320b is representative of the type of gaseous fuel flowing over hot-wire sensor 360 and is a function of a temperature of the hot-wire sensor that in turn is function of a mass-flow of a particular type of gaseous fuel over the hot-wire sensor. In embodiments that employ hot-wire sensor 360, signal 320b can be an analog or digital signal representative of the temperature of hot-wire sensor 360 or a change in temperature across hot-wire sensor 360. In other embodiments, hot-wire sensor 360 can process the temperature signal itself to determine the type of gaseous fuel and transmit information indicating the type of gaseous fuel through an analog or digital signal to electronic controller 19x.

Alternatively, or additionally, a combustion sensor as disclosed in the Applicant's U.S. Pat. No. 10,519,888 issued on Dec. 31, 2019, can be employed in fuel systems 101, 102, 103, and 104 in other embodiments. The combustion sensor employs an accelerometer sensor (that can be a knock sensor), which is a type of acoustic sensor, that generates a first pressure signal representative of combustion chamber pressure and an inlet manifold pressure sensor that generates a second pressure signal representative of inlet manifold pressure. The first and second pressure signals collectively represent signal 320x (seen in FIGS. 1, 2, 3, and 4) and are received and processed by electronic controllers 191, 192, 193, and 194 to determine the type of gaseous fuel currently being consumed by engines 121, 122, and 124. The combustion sensor can detect changes in fuel quality that can be a result of changing fuel types (including compositional changes) supplied to engines 121, 122, and 124, for example by mixing different types of fuel in storage vessels 130, 130c, 131, 131b and/or 132.

Figure 9:
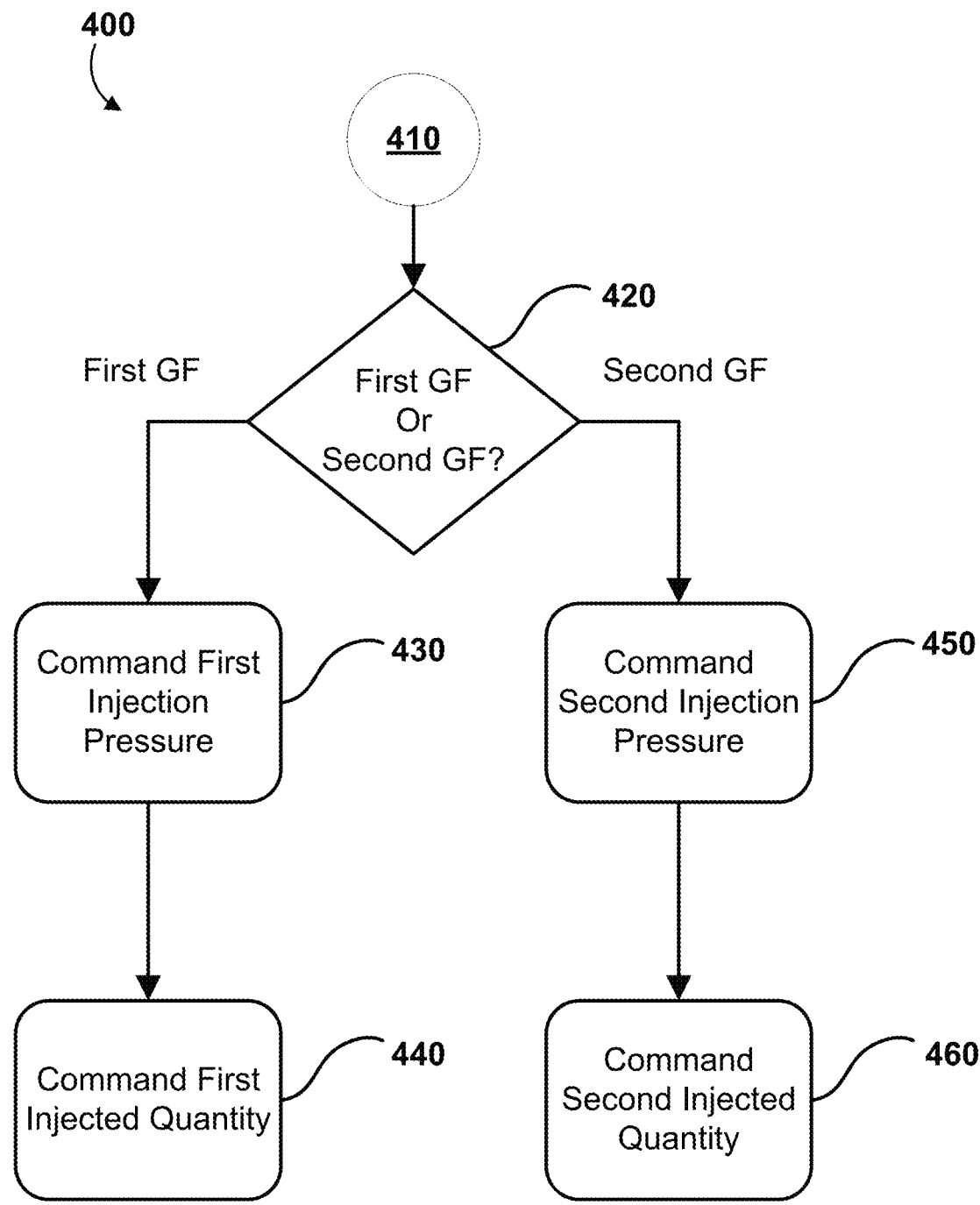
FIG. 9 is a flow chart view of an algorithm for pressure regulating and injecting a first gaseous fuel and/or a second gaseous fuel in the fuel systems of FIGS. 1, 2, 3, and 4.

Referring to FIG. 9, there is shown a flow chart of algorithm 400 for regulating gaseous fuel pressure and injecting gaseous fuel into combustion chambers 111, 112, and 114 in internal combustion engines 121, 122, and 124, respectively. Algorithm 400 is programmed into electronic controllers 191, 192, 193, and 194. In step 410, engines 121, 122, and 124 are started and in step 420, electronic controllers 191, 192, 193, and 194 determine whether internal combustion engines 121, 122, and 124 are fueling with the first gaseous fuel or the second gaseous fuel. Electronic controllers 191, 192, 193, and 194 can determine the type of gaseous fuel that is in use by employing one or more onboard sensors supplying signal(s) representative of the fuel type and/or one or more remote or wireless signals indicative of the gaseous fuel type stored in a or each storage vessel supplying the internal combustion engine. Depending on system requirements such as resolution of compositional accuracy of mole percent hydrogen in the gaseous fuel, one or more fuel type indicators may be employed including fuel-type switch 330, hot-wire sensor 360, combustion sensor, capacitance sensor, dynamic viscosity sensor, discrete acoustic wave and phase detection sensor, spectral analysis data (e.g. from near infrared or fiber-enhanced Raman spectroscopy), or any other technique known or developed in the future. When the first gaseous fuel is stored in a separate storage vessel from a storage vessel that stores the second gaseous storage vessel, as in the illustrated embodiments of FIGS. 5 and 6, then electronic controllers 191, 192, 193, and 194 can extrinsically know which fuel type is currently flowing to engines 121, 122, and 124 by selecting which one of shut-off valves 340 and 350 (controlled by the electronic controllers) is open. In the event the first gaseous fuel is currently flowing to and being consumed by engines 121, 122, and 124, electronic controllers 191, 192, 193, and 194 command a first injection pressure in step 430 and command an injected quantity of the first gaseous fuel be injected into combustion chambers of engines 121, 122, and 124, respectively in step 440. In the event the second gaseous fuel is currently flowing to and being consumed by engines 121, 122, and 124, electronic controllers 191, 192, 193, and 194 command a second injection pressure in step 450 and command an injected quantity of the second gaseous fuel be injected into combustion chambers of engines 121, 122, and 124, respectively in step 460. Whether the injected quantity of the first gaseous fuel or the injected quantity of the second gaseous fuel is being injected, the gaseous fuel is being injected later in the compression stroke, and particularly within 90 crank angle degrees (CA°) of top dead center (TDC) during the compression stroke, and more particularly within 45 CA° of TDC during the compression stroke such that the injected quantity of the first gaseous fuel or the injected quantity of the second gaseous fuel burns in a diffusion combustion mode. In an exemplary embodiment, the first gaseous fuel is natural gas, and the second gaseous fuel is hydrogen. When the first gaseous fuel and the second gaseous fuel are defined in this way, the second injection pressure is less than the first injection pressure by a pressure value. The comparison of the first injection pressure to the second injection pressure is made at identical engine load and engine speed conditions. In this regard, the first injection pressure can be a function of engine load and engine speed conditions, and the second injection pressure can be a function of engine load and engine speed conditions. The pressure value between the first injection pressure and the second injection pressure can be greater than 15 bar in some embodiments, greater than 20 bar in other embodiments, and greater than 25 bar in still other embodiments and is a function of the fuel constituents and/or engine operation requirements. Referring back to step 410, where the engines 121, 122, and 124 are started, it is noteworthy that the injection pressure during starting can be the first injection pressure, the second injection pressure, or another injection pressure suitable for the starting of the engines. In other embodiments, algorithm 400 is not limited to just two types of gaseous fuel and can differentiate between more than two types of gaseous fuel. For example, the more than two types of gaseous fuel can be natural gas, hydrogen, and mixtures of natural gas and hydrogen with varying mixture ratios. In a practical example, when only one storage vessel is employed and is filled with natural gas and/or hydrogen, there can be varying mixtures within the storage vessel. In another example, when only one storage vessel is employed and stores natural gas in liquified form and a mixture of hydrogen and natural gas in vapor form, there can be a varying mixture of natural gas and hydrogen supplied through conduit 176 and natural gas through liquified gaseous fuel conduit 178.

Figure 10:
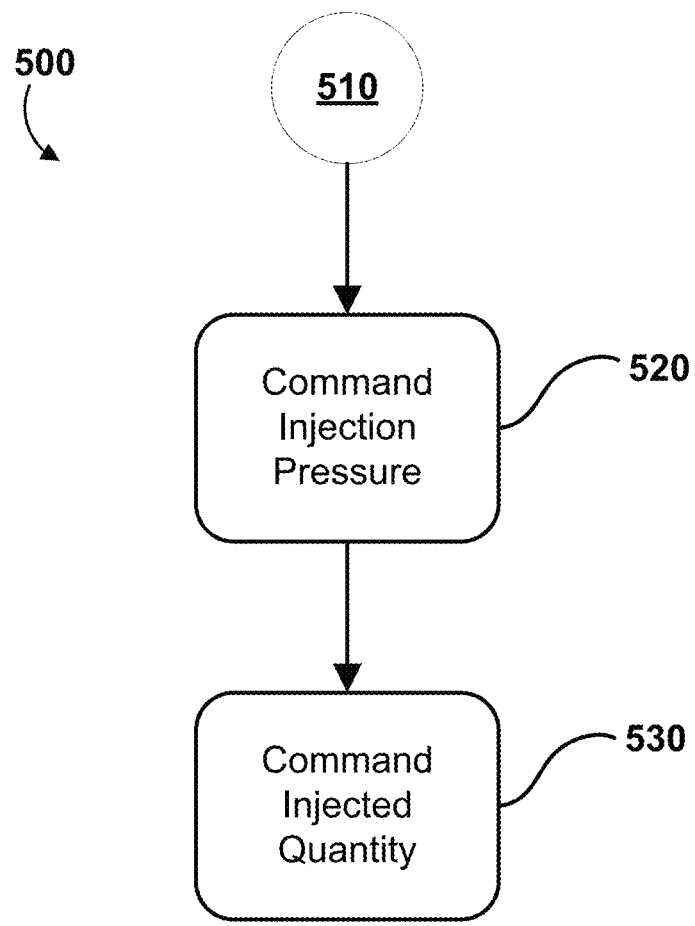
FIG. 10 is a flow chart view of an algorithm for pressure regulating and injection of hydrogen in the fuel systems of FIGS. 1, 2, 3, and 4.

Fuel systems 101, 102, 103, and 104 can be employed in applications that only fuel with hydrogen such that signal 320x (seen in FIGS. 1, 2, 3, and 4) is not required whereby electronic controllers 191, 192, 193, and 194 are programmed that the gaseous fuel in storage vessel 130, 130c, 131, 132 is hydrogen only. In the context of this application, a referenced fuel gas is substantially the particular gas referenced. Purity of gaseous fuels as a fuel gas at refueling stations for example are subject to geographical regulations and generally must meet or exceed a designated technical specification for purity. One such technical specification for hydrogen as a fuel gas is the international standard ISO 14687-2-2019 which specifies maximum permissible concentrations for many key impurities depending on use and has been adopted in many jurisdictions. Electronic controllers 191, 192, 193, and 194 know a priori that the fuel is hydrogen such that it is not necessary to detect the type of gaseous fuel. Referring now to FIG. 10 there is shown a flow chart of algorithm 500 for regulating gaseous fuel pressure and injecting gaseous fuel into combustion chambers 111, 112, and 114 in internal combustion engine 121, 122, and 124, respectively when the gaseous fuel is hydrogen. In step 510, engines 121, 122, and 124 are started. In step 520 electronic controllers 191, 192, 193, and 194 command an injection pressure for the gaseous fuel (i.e., hydrogen) that can be a function of engine load and engine speed conditions. In an exemplary embodiment, when engines 121, 122, and 124 are operating at least at a power level greater than 50% of their maximum output power, the injection pressure employed can be equal to a peak in-cylinder pressure times a multiplication factor in at least a portion of this engine output power range. The peak in-cylinder pressure is the peak pressure in the combustion chamber resulting from combustion. The multiplication factor in some exemplary embodiments is within a range of 1.15 to 1.40, and in other exemplary embodiments within a range of 1.16 to 1.3, and in still other exemplary embodiments within a range of 1.17 to 1.25. As an example, when the peak cylinder pressure is 210 bar, the injection pressure can be within a range of 241.5 bar and 294 bar in some embodiments, and within a range of 243.6 bar and 273 bar in other embodiments, and within a range of 245.7 bar and 262.5 bar in still other embodiments. An exemplary multiplication factor for hydrogen of 1.2 provides a good balance between efficiency and NOx emissions. In contrast, for other gaseous fuels, such as natural gas, an exemplary multiplication factor of around 1.43 provides a similarly correlated balance between efficiency and NOx emissions, such that when the peak cylinder pressure is 210 bar, a selected injection pressure is around 300 bar. In step 530 electronic controllers 191, 192, 193, and 194 command the in-cylinder fuel injector to inject within 90 crank angle degrees of top dead center during a compression stroke an injected quantity of the gaseous fuel into the combustion chamber.

It is counter intuitive to decrease injection pressure when fueling with hydrogen and burning the fuel in a diffusion combustion mode compared to other gaseous fuels for a variety of reasons. For example, one reason is the energy content of the hydrogen (the second fuel) injected into the combustion chamber is less than the energy content of the first fuel when injecting at identical injection pressures and injecting identical injected volumes. The energy content of a fuel per unit volume that can be released as heat during combustion is proportional to a product of a heating value of the fuel and a density of the fuel according to Equation 1 below. As an example, Table 1 below lists the lower heating values, the densities, the energy content per unit volume, and the energy ratio when the first gaseous fuel is natural gas and the second gaseous fuel is hydrogen. According to Table 1, when identical volumes are injected at identical injection pressures, the energy content of the injected natural gas is between 3.06 and 3.93 times greater than the energy content of the injected hydrogen. Based on this analysis, one would expect to have to increase the injection pressure when injecting hydrogen compared to injecting natural gas. Alternatively, or additionally, the injection window for hydrogen can also be increased; however, when introducing the fuel later during the compression stroke so the fuel burns in a diffusion combustion mode there may not be enough time available to introduce the fuel by expanding the injection window.

$$\text{Energy Content} \propto \text{Heating Value} * \text{Density} \qquad \text{Equation 1}$$

TABLE 1

| Fuel | Heating Value[1] (MJ/kg) | Density[2] (kg/m$^3$) | HV * D (per m$^3$) | $HV_{NG}*D_{NG}$:$HV_{H2}*D_{H2}$ Ratio |
|---|---|---|---|---|
| Natural Gas (NG) | 47.1 | 0.7-0.9 | 32.97-42.39 | 3.06-3.93 |
| Hydrogen (H2) | 120 | 0.0899 | 10.788 | |

[1]approximate lower heating value, https://www.engineeringtoolbox.com/fuels-higher-calorific-values-d_169.html
[2]density at standard temperature and pressure defined as 0° C. and 1 atm Moreover, as a rule consistent with most fuels, lower injection pressures do not improve combustion since there is reduced turbulence generated during injection that reduces local mixing of fuel with air, which reduces ignitability and combustibility due to increased local rich air/fuel equivalence ratio zones. The air/fuel equivalence ratio, also known as lambda (λ), is defined as the ratio of the air/fuel ratio over the stoichiometric air/fuel ratio, where when the air/fuel equivalence ratio is stoichiometric, λ=1, when the air/fuel equivalence ratio is lean, λ>1, and when the air/fuel equivalence ratio is rich, λ<1. Note that when the overall or global air/fuel equivalence ratio in a combustion chamber is stoichiometric (λ=1) or lean (λ>1), there can still be zones within the combustion chamber that have a local rich-air/fuel equivalence ratio (λ<1) due to lack of mixing of fuel with air prior to ignition and combustion. For typical gaseous fuels there is a desire to reduce and in some cases eliminate the local rich zones prior to ignition and combustion.

Figure 11:
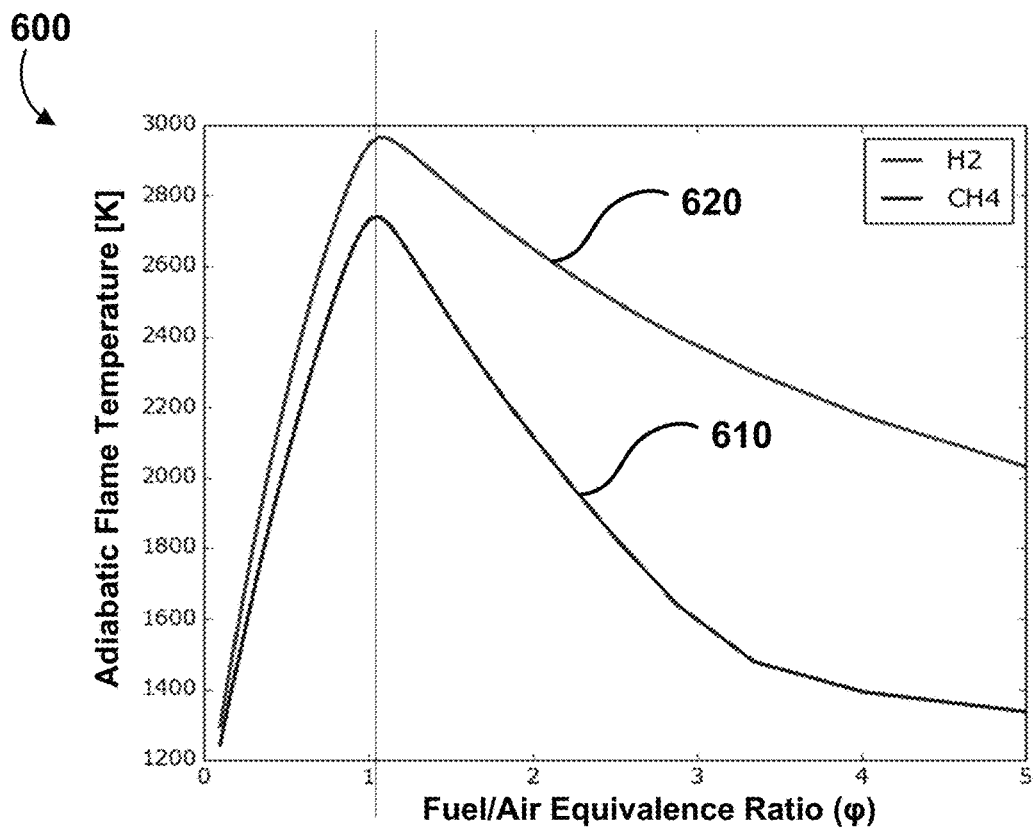
FIG. 11 is a chart view of adiabatic flame temperature versus fuel/air equivalence ratio for methane and hydrogen.
Figure 12:
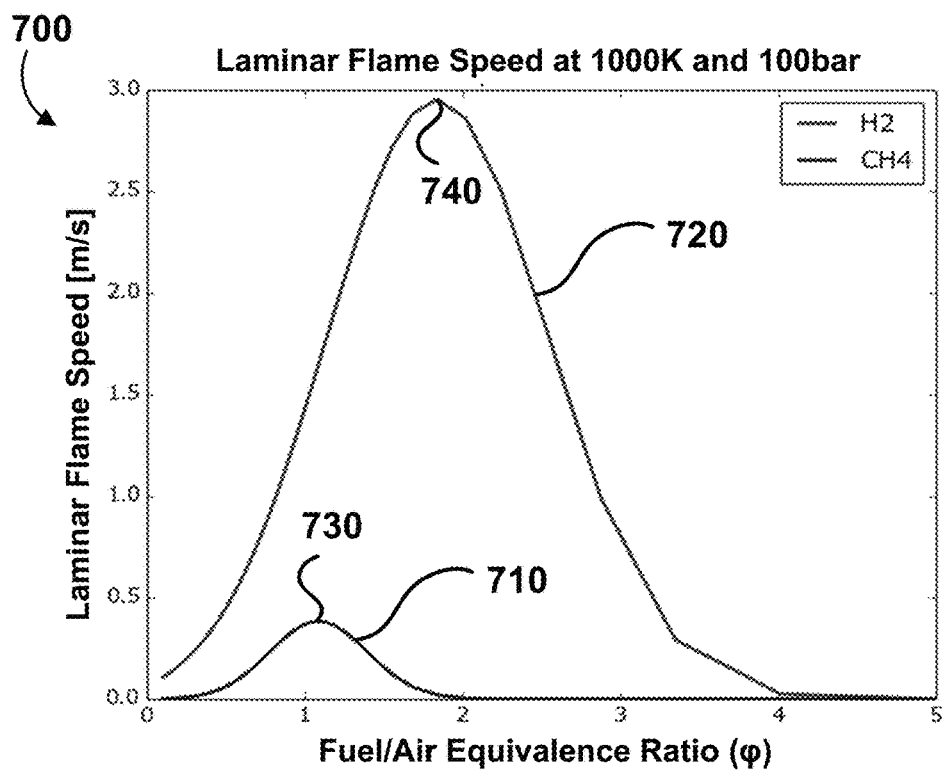
FIG. 12 is a chart view of laminar flame speed versus fuel/air equivalence ratio for methane and hydrogen.

Referring now to FIG. 11, chart 600 illustrates adiabatic flame temperature (on the y-axis) versus fuel/air equivalence ratio (on the x-axis) and includes plot 610 for methane ($CH_4$) and plot 620 for hydrogen ($H_2$). The fuel/air equivalence ratio, also known as phi (φ), is the inverse of the air/fuel equivalence ratio (λ) where φ=1, λ=1 for a stoichiometric fuel/air mixture, φ<1, λ>1 for a lean fuel/air mixture and φ>1, λ<1 for a rich fuel/air mixture. On the fuel rich side (φ>1) the adiabatic flame temperature for natural gas decreases faster compared to hydrogen. This may be due to several of the reaction mechanisms such as the steam-methane reforming reaction and pyrolysis reactions are strongly endothermic. With reference to FIG. 12, chart 700 illustrates laminar flame speed (on the y-axis) versus fuel/air equivalence ratio (on the x-axis) and includes plot 710 for methane ($CH_4$) and plot 720 for hydrogen ($H_2$). Peak laminar flame speed 740 for hydrogen is more than six times that of peak laminar flame speed 730 for methane. While peak laminar flame speed 730 for methane appears around stoichiometry (φ=1), peak laminar flame speed 740 for hydrogen appears significantly to the fuel-rich side (φ=1.8). The adiabatic flame temperature and the laminar flame speed of hydrogen indicate that hydrogen has more tolerance to fuel-rich operation than methane (as well as natural gas since natural gas is typically around 95 mole % methane with a range from 87 to 98 mole % methane). Accordingly, injecting hydrogen at a reduced injection pressure compared to an injection pressure used to inject natural gas (and all other gaseous fuels) does not reduce the efficiency of the engine, and in fact the efficiency and fuel economy may improve as there are more local rich zones of fuel when injecting hydrogen at the lower injection pressure.

Moreover, the increased diffusivity of hydrogen compared to other gaseous fuels, such as natural gas, is also a factor in why the efficiency of engines 121, 122, and 124 remains within an acceptable range when decreasing the injection pressure for hydrogen compared to the other gaseous fuels for a given engine load and engine speed condition, and particularly but not exclusively those injection pressures employed when the engines are operating above 50% of their maximum rated output power. In contrast, if these other gaseous fuels were injected at the reduced injection pressure the efficiency of engines 121, 122, and 124 would decrease below an acceptable value. For example, hydrogen is more diffusive than natural gas in air. The mass diffusion coefficient for hydrogen is approximately 0.756 cm$^2$/s in an excess of air at 1 atm pressure and 20° C. Natural gas is a mixture of gaseous fuels whose primary constituent is methane (typically natural gas has around 95 mole % methane with a range from 87 to 98 mole % methane). The mass diffusion coefficient of methane is 0.21 cm$^2$/s in an excess of air at 1 atm pressure and 20° C. A ratio between the mass diffusion coefficients of hydrogen to methane is 3.6 (0.756/0.21). The larger mass diffusion coefficient for hydrogen permits hydrogen to mix with air more effectively in combustion chambers 111, 112, 114 when the hydrogen is injected at a reduced injection pressure compared to natural gas (and other gaseous fuels).

Figure 13:
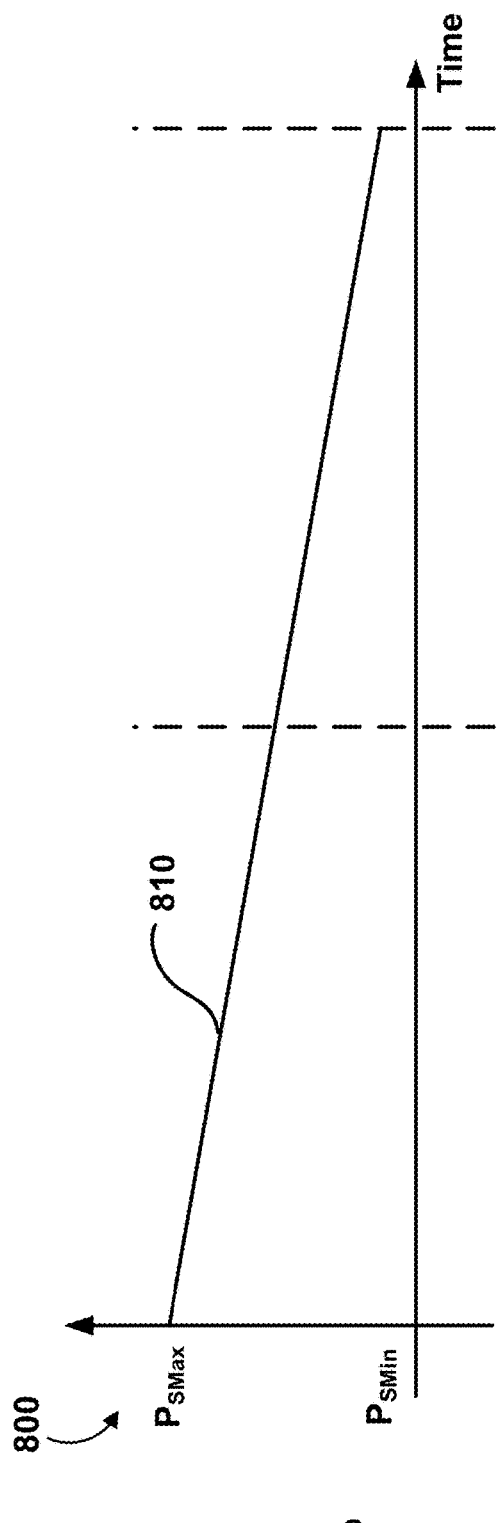
FIG. 13 is a chart view of storage vessel pressure versus time for the embodiments of FIGS. 1, 2, 3, 4, 5, and 6.
Figure 14:
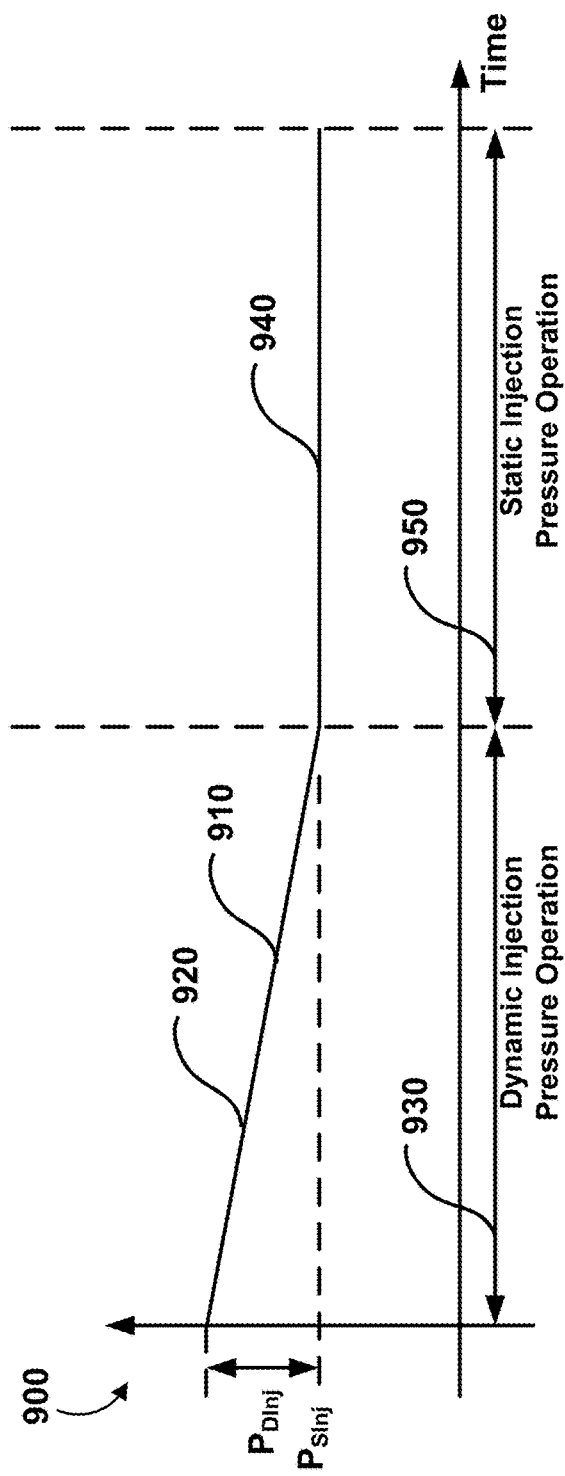
FIG. 14 is a chart view of injection pressure versus time for the embodiments of FIGS. 1, 2, 3, 4, 5, and 6.

The fuel economy of engines 121, 122, and 124 can be improved when fueling with hydrogen by reducing injection pressure for hydrogen compared to natural gas. Referring now to FIGS. 13 and 14, there are shown chart 800 for storage pressure and chart 900 for injection pressure. Storage pressure plot 810 represents the storage pressure of hydrogen when it is stored as a compressed gas within a storage vessel, such as storage vessel 130 in FIGS. 1, 2, 3, and 4; storage vessels 131 and 132 in FIGS. 5 and 6; or storage vessel 130c in FIGS. 7a to 7d. As engines 121, 122 and 124 consume the hydrogen from these storage vessels the storage pressure and therefore the supply pressure decreases from maximum storage pressure $P_{SMAX}$, which is the maximum rated pressure that can be stored in the storage vessel, to minimum storage pressure $P_{SMIN}$, which is the minimum pressure required for the engines to operate. Storage pressure plot 810 is illustrated as a linearly decreasing function; however, this is not a requirement and more generally the storage pressure plot decreases as a monotonically non-increasing function during operation between refueling the storage vessel. Injection pressure plot 910 represents the injection pressure of hydrogen in gaseous-fuel rail 170, which is substantially equivalent to the delivery pressure to the fuel injector. Section 920 of injection pressure plot 910 represents zone 930 of dynamic injection pressure $P_{DINJ}$ operation where the injection pressure tracks and is substantially equal to the storage pressure. There may be a small difference between storage pressure and injection pressure in dynamic zone 930 due to pressure drops across valves and other components in fuel systems 101, 102, 103, and 104. Section 940 of injection pressure plot 910 represents zone 950 of static injection pressure $P_{SINJ}$ operation where the storage pressure has decreased below a desired injection pressure such that the supply pressure needs to be increased (for example, by compressor 220 in FIGS. 1, 2, 3, 4, 5, 6, 7a, 7b, 7c and 7d) to the static injection pressure $P_{SINJ}$ (that is, the desired injection pressure). Note that there can be more than one desired injection pressure based on engine load and engine speed whereby the injection pressure operation switches back and forth between the dynamic zone 930 and the static zone 950 as the engine load and the engine speed change. By reducing the static injection pressure $P_{SINJ}$ (that is, the desired injection pressure) for hydrogen compared to other gaseous fuels, such as natural gas, the storage pressure is allowed to decrease to a lower value before there is a need to turn on compressor 220 to compress the hydrogen to the desired injection pressure. Accordingly, compressor 220 is operated less with the reduced desired injection pressure whereby the parasitic power consumption due to operating compressor 220 is reduced thereby improving the fuel economy of engines 121, 122 and 124. Moreover, by sending the higher storage pressure directly to the injector within zone 930 of dynamic injection pressure operation the combustion efficiency of engines 121, 122, and 124 may improve because typically higher injection pressure results in higher efficiency, particularly when the engine does not need to expend energy in compressing the gaseous fuel to the higher injection pressure; that is, this advantage comes free of energy expenditure in dynamic zone 930. Note that this technique also applies to engines 121, 122, and 124 operating with any gaseous fuel when the storage pressure initially is above the desired injection pressure.

Figure 15:
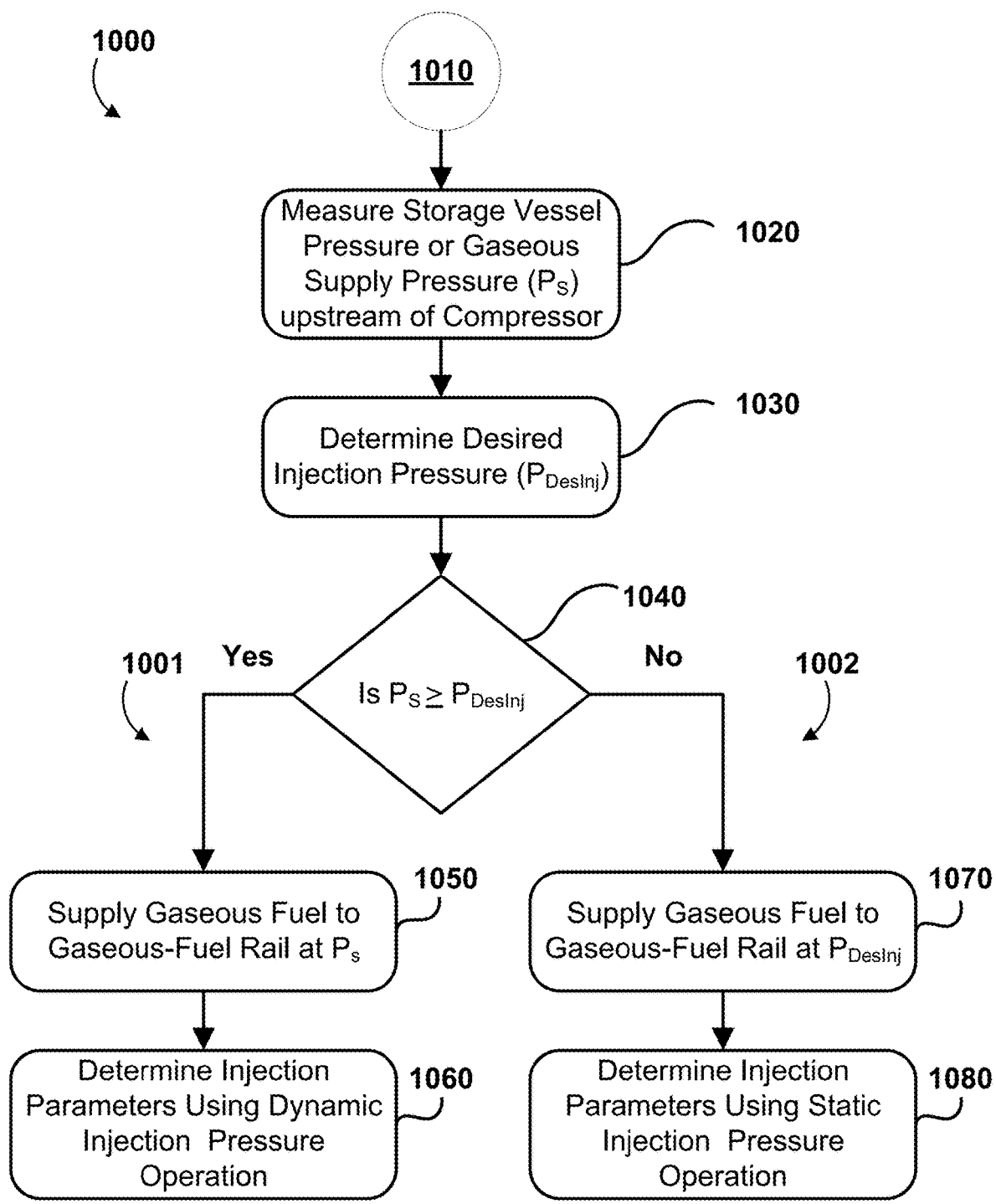
FIG. 15 is a flow chart view of an algorithm for selecting between dynamic injection pressure operation and static injection pressure operation for the embodiments of FIGS. 1, 2, 3, 4, 5, and 6.
Figure 16:
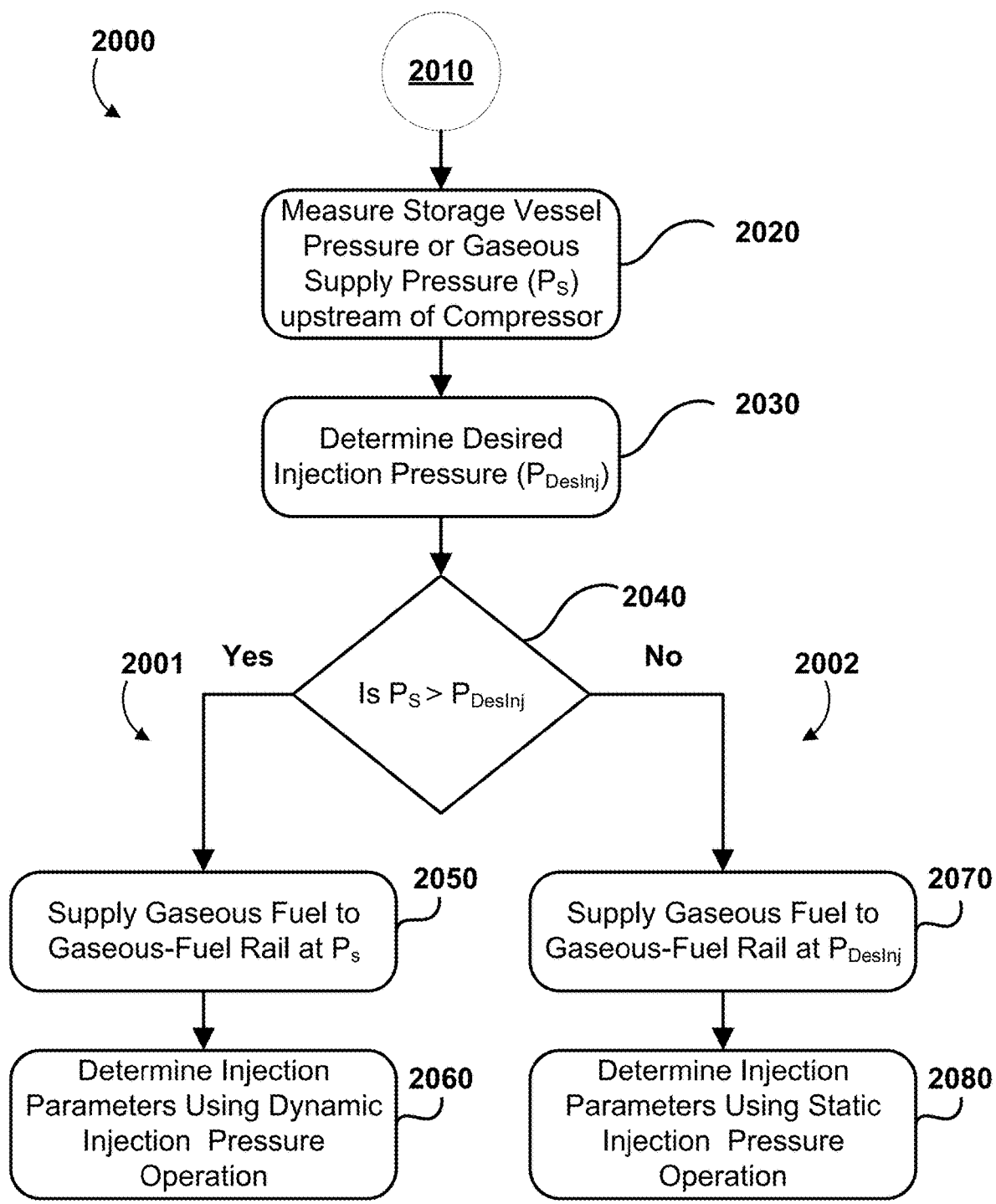
FIG. 16 is a flow chart view of an algorithm for selecting between dynamic injection pressure operation and static injection pressure operation.

Referring now to FIG. 15, algorithm 1000 is illustrated for regulating gaseous fuel pressure and injecting gaseous fuel into combustion chambers 111, 112, and 114 of internal combustion engines 121, 122, and 124, respectively. Algorithm 1000 is programmed into electronic controllers 191, 192, 193, and 194, and when performed by the electronic controllers the entry point into the algorithm is step 1010. In step 1020 electronic controllers 191, 192, 193, and 194 determine supply pressure $P_S$ which is representative of pressure in storage vessel 130 (see FIGS. 1, 2, 3, and 4); or in storage vessel 131 or 132 (see FIGS. 5 and 6); or storage vessel 130c when conduit 176 is open to supply conduit 174 upstream of compressor 220 (see FIGS. 7b and 7d). Supply pressure $P_S$ can also be representative of pressure in storage vessel supply conduit 173 and supply conduit 174 of gaseous fuel supplied from storage vessel 130c after gaseous fuel has exited vaporizers 235 or 237 upstream of compressor 220. In step 1030 the desired injection pressure $P_{DesInj}$ is determined as a function of engine load and engine speed conditions. In the context of this application the desired injection pressure is an injection pressure that is preferred for operation of engines 121, 122, and 124 at respective engine load and engine speed conditions, where in the event the supply pressure is below the desired injection pressure, the gaseous fuel is pressurized from the storage pressure to the desired injection pressure. There can be more than one desired injection pressure based on engine load and engine speed conditions. The supply pressure $P_s$ is compared to the desired injection pressure $P_{DesInj}$ in step 1040. In the event the supply pressure $P_s$ is greater than or equal to the desired injection pressure $P_{DesInj}$, algorithm 1000 proceeds to dynamic zone routine 1001 and step 1050 where the gaseous-fuel from storage vessels 130, 130c, 131, or 132 is supplied to gaseous-fuel rail 170 such that actual injection pressure $P_{INJ}$ is substantially equal to supply pressure $P_S$ (for example, there can be small pressure drops across valves and other components as gaseous fuel flows from the storage vessels to the gaseous-fuel rail). Note that the gaseous fuel from storage vessels 130, 130c, 131, or 132 is supplied through gaseous fuel supply conduit 174 or conduit 173 directly to the gaseous-fuel rail 170 without compression. In the embodiment of FIGS. 1, 3, and 4, a bypass valve (not shown) commanded by electronic controllers 191, 192, 193, and 194 around pressure regulators 141, 143, and 144 can be opened to supply the gaseous fuel from the storage vessel 130 to gaseous-fuel rail 170 without regulation. It is noteworthy that the pilot-fuel pressure in pilot-fuel rail 280 in FIG. 4 is still maintained within a pressure differential pressure of the gaseous-fuel pressure in gaseous-fuel rail 170 by pressure regulator 144, and the gaseous fuel is injected later in the compression stroke, and particularly within 90 crank angle degrees (CA°) of top dead center (TDC) during the compression stroke, and more particularly within 45 CA° of TDC during the compression stroke such that the injected quantity of the gaseous fuel burns in a diffusion combustion mode. In other embodiments, the gaseous fuel from storage vessels 130, 130c, 131, or 132 can be down regulated to one or more injection pressures between the desired injection pressure $P_{DesInj}$ and the supply pressure $P_S$ as the storage pressure decreases, and this down regulation can be part of the function of pressure regulators 141, 143, and 144. For example, as the storage pressure decreases, the pressure of the gaseous fuel supplied from the storage vessel 130, 130c, 131, and 132 can be down regulated in discrete steps to a plurality of injection pressures that form a monotonic non-increasing function. In step 1060 the injection parameters are determined using dynamic injection pressure operation, whereby the start-of-injection timing and the pulse width are selected as a function of the actual injection pressure $P_{INJ}$ (that can be equal to the supply pressure $P_S$ or a value between the desired injection pressure $P_{DesInj}$ and the supply pressure $P_S$) instead of the desired injection pressure $P_{DesInj}$. In some embodiments, the method can further include adjusting the desired injection pressure lower than a predetermined or known first desired injection pressure for a first gaseous fuel for fueling the internal combustion engine at the same engine load and engine speed. The first gaseous fuel containing a lower mole % or even essentially 0 mole % hydrogen than the fuel being supplied to the internal combustion engine. In other embodiments, the mole % hydrogen of the fuel being supplied to the internal combustion engine is known by the controller or otherwise predetermined by the controller and the desired injection pressure for the engine load and engine speed can be directly supplied from for example fuel specific look-up tables and fueling maps. The gaseous fuel is injected later in the compression stroke, and particularly within 90 crank angle degrees (CA°) of top dead center (TDC) during the compression stroke, and more particularly within 45 CA° of TDC during the compression stroke such that the injected quantity of the gaseous fuel burns in a diffusion combustion mode. In the event the supply pressure $P_S$ is less than the desired injection pressure $P_{DesInj}$, algorithm 1000 proceeds to static zone routine 1002 and in step 1070 the gaseous fuel from storage vessels 130, 130c, 131, or 132 is pressurized to the desired injection pressure $P_{DesInj}$ before it is supplied to gaseous-fuel rail 170 such that injection pressure $P_{INJ}$ is equal to the desired injection pressure $P_{DesInj}$. In step 1080 the injection parameters are determined using static injection pressure operation, whereby the start-of-injection timing and the pulse width are selected as a function of the desired injection pressure $P_{DesInj}$. The gaseous fuel is injected later in the compression stroke, and particularly within 90 crank angle degrees (CA°) of top dead center (TDC) during the compression stroke, and more particularly within 45 CA° of TDC during the compression stroke such that the injected quantity of the gaseous fuel burns in a diffusion combustion mode.

In embodiments having intelligent pressure and operation management, the pressure threshold for switching between dynamic zone routine 1001, 2001 and static zone routine 1002, 2002 as well as when compressor 220 is actuated in the static zone can be determined using a predictive operating mode and/or a learned use pattern for a particular engine, a vehicle, a fueling composition, an operator, and/or a geographical location input to electronic controller 19x. The desired injection pressure can be further determined as a function of a learned use pattern for the internal combustion engine, a fueling composition, an operator and/or a geographical location. For example, for a system refueling in a specific geographic location, prior learned operation of the internal combustion engine operating with a fuel composition from an earlier refueling operation in the same geographical location can be employed for determining the desired injection pressure which can be a function, at least in part, on a learned operation pattern for the internal combustion engine previously fueled at the same geographic location. In this event controller 19x can set a desired injection pressure $P_{DesInj}$ for the engine load and engine speed based on a learned operating pattern for the fuel composition specific operation. In addition to or alternatively in some exemplary embodiments, the controller can employ intelligent pressure and operation management in a predictive mode. For example, the desired injection pressure can be a function of a predictive engine load and engine speed demand by the internal combustion engine. For example raising the desired injection pressure when anticipating pulling a hill or a high load operation; and/or adjusting the desired injection pressure when anticipating reducing engine speed or when desiring to draw down pressure in a particular storage vessel (130, 130c, 131, 131b, or 132) in anticipation of refueling or parking for an extended period of time as indicated by an operator, a geographical location, a distance and/or time to a geographical location, or a remaining fuel amount.

In spark-ignited, premixed hydrogen engines the injection pressure is a fixed value between 2 and 30 bar (that is, a relatively low pressure), and the hydrogen is injected during the intake stroke either upstream of an intake valve or directly into a combustion chamber early in the compression stroke (that is, within 90 CA° after bottom dead center during the compression stroke). These engines operate with a global stoichiometric air/fuel equivalence ratio ($\lambda=1$) or on the lean side ($\lambda>1$) of the global stoichiometric air/fuel equivalence ratio and are not capable of either reducing injection pressure substantially, since they are already operating at very low injection pressures, or operating with a global rich air/fuel equivalence ratio ($\lambda<1$).

Expanding on the type of gaseous fuels employed when the embodiments of FIGS. 1, 2, 3, 4, 5, 6 and 7a-d are used in multi-fuel or flexi-fuel applications, the first gaseous fuel includes a gaseous fuel other than hydrogen and the second gaseous fuel includes hydrogen. The first gaseous fuel can include one of biogas, ethane, methane, natural gas, butane, propane, or mixtures of these fuels. The first gaseous fuel can be any methane rich gas, such as fossil natural gas or natural gas from a renewable resource. In some embodiments the first gaseous fuel includes less than 1 mole % hydrogen and the second gaseous fuel includes between 1 mole % and 100 mole % hydrogen. In some embodiments the first gaseous fuel includes less than 1 mole % hydrogen and the second gaseous fuel has greater than 1 mole % hydrogen. In some embodiments the first gaseous fuel includes less than 1 mole % hydrogen and the second gaseous fuel includes at least 5 mole % hydrogen; or the second gaseous fuel can include greater than 15 mole % hydrogen; or greater than 25 mole % hydrogen; or greater than 40 mole % hydrogen; or greater than 50 mole % hydrogen; or greater than 70 mole % hydrogen; or greater than 90 mole % hydrogen. The pressure value between the first injection pressure of the first gaseous fuel and the second injection pressure of the second gaseous fuel can be a function of the mole % of hydrogen in the second gaseous fuel. The pressure value can also be a function of the first gaseous fuel, such as the type of gaseous fuel and whether the first gaseous fuel includes hydrogen. The pressure value can also be a function of the difference in the mole % hydrogen between the second gaseous fuel and the first gaseous fuel. In some embodiments the first gaseous fuel can essentially contain 0 mole % hydrogen. In some embodiments the difference in mole percent hydrogen between the second gaseous fuel and the first gaseous fuel can be 5 mole % hydrogen or greater in the second gaseous fuel than in the first gaseous fuel; or greater than 15 mole % hydrogen; or greater than 25 mole % hydrogen; or greater than 40 mole % hydrogen; or greater than 50 mole % hydrogen; or greater than 70 mole % hydrogen; or greater than 90 mole % hydrogen. In some embodiments the second gaseous fuel is substantially hydrogen while in other embodiments the second gaseous fuel contains hydrogen and can further include one of biogas, ethane, methane, natural gas, butane, propane, or mixtures of these fuels. The first gaseous fuel can include essentially 0 mole % hydrogen. The pressure value between the first injection pressure and the second injection pressure can be greater than 15 bar in some embodiments, greater than 20 bar in other embodiments, and greater than 25 bar in still other embodiments and is a function of fuel constituents and/or engine operation requirements. The second injection pressure is at least 5% less than the first injection pressure at the same engine load and the engine speed; or is at least 10% less than the first injection pressure at the engine load and the engine speed; or is at least 20% less than the first injection pressure at the engine load and the engine speed depending on the embodiment. The percent reduction of injection pressure of the second gaseous fuel for the same engine load and engine speed is a function of the mole percent hydrogen in the second gaseous fuel, the first gaseous fuel type; and/or the difference between the mole percent hydrogen between the second gaseous fuel and the first gaseous fuel for the same engine load and engine speed of the particular internal combustion engine.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. An apparatus for regulating and injecting a first gaseous fuel or a second gaseous fuel in an internal combustion engine comprising:
   a pressure regulator for regulating a pressure of the first gaseous fuel or a pressure of the second gaseous fuel;
   an in-cylinder fuel injector in fluid communication with the pressure regulator to receive the first gaseous fuel or the second gaseous fuel for directly injecting the first gaseous fuel or the second gaseous fuel into a combustion chamber of the internal combustion engine; and a controller operatively connected with the pressure regulator and the in-cylinder fuel injector and programmed to:
when fueling the internal combustion engine with the first gaseous fuel:
command the pressure regulator to regulate the pressure of the first gaseous fuel to a first injection pressure at an engine load and an engine speed; and
command the in-cylinder fuel injector to inject within 90 crank angle degrees of top dead center during a compression stroke of the engine an injected quantity of the first gaseous fuel into the combustion chamber at the first injection pressure; and
when fueling the internal combustion engine with the second gaseous fuel:
command the pressure regulator to regulate the pressure of the second gaseous fuel to a second injection pressure at the engine load and the engine speed; and
command the in-cylinder fuel injector to inject within 90 crank angle degrees of top dead center during the compression stroke of the engine an injected quantity of the second gaseous fuel into the combustion chamber at the second injection pressure;
wherein the first gaseous fuel comprises less mole percent hydrogen than the second gaseous fuel;
the second injection pressure is less than the first injection pressure at the engine load and the engine speed by a pressure value; and
the injected quantity of the first gaseous fuel and the injected quantity of the second gaseous fuel burn in a diffusion combustion mode.

2. The apparatus as claimed in claim 1, wherein the pressure value is a function of a mole percent of hydrogen in the second gaseous fuel; or the pressure value is a function of a difference in mole percent hydrogen between the second gaseous fuel and the first gaseous fuel.

3. The apparatus as claimed in claim 1, wherein the pressure value is a function of the first gaseous fuel type; or the pressure value between the first injection pressure and the second injection pressure is greater than 25 bar; or a combination thereof.

4. The apparatus as claimed in claim 1, wherein the first gaseous fuel comprises biogas, ethane, methane, natural gas, butane, propane, or mixtures of these fuels; and/or the difference in mole percent hydrogen between the second gaseous fuel and the first gaseous fuel is 5 mole percent hydrogen or greater in the second gaseous fuel than in the first gaseous fuel.

5. The apparatus as claimed in claim 4, wherein the second gaseous fuel further comprises biogas, ethane, methane, natural gas, butane, propane, or mixtures of these fuels.

6. The apparatus as claimed in claim 1, wherein the second gaseous fuel is substantially hydrogen.

7. The apparatus as claimed in claim 1, further comprising:
a storage vessel for storing a gaseous fuel;
a compressor in fluid communication with the storage vessel and operative to compress the gaseous fuel from the storage vessel; and
a bypass valve in fluid communication with the storage vessel and selectively commanded by the controller to a bypass position to fluidly communicate the gaseous fuel from the storage vessel around the compressor, and a blocking position to fluidly communicate the gaseous fuel from the storage vessel through the compressor;
wherein the gaseous fuel is the first gaseous fuel or the second gaseous fuel; and
the in-cylinder fuel injector fluidly receives the gaseous fuel from the compressor or the bypass valve.

8. The apparatus as claimed in claim 7, wherein the storage vessel stores the gaseous fuel as a compressed gas.

9. The apparatus as claimed in claim 7, wherein the storage vessel stores the first gaseous fuel as a liquified gaseous fuel and the second gaseous fuel as a compressed gas.

10. The apparatus as claimed in claim 7, wherein the controller is programmed to command the bypass valve to the bypass position to fluidly communicate the gaseous fuel around the compressor when a pressure of the gaseous fuel in the storage vessel is greater than the first injection pressure when the gaseous fuel is the first gaseous fuel, and the controller is programmed to command the bypass valve to the bypass position to fluidly communicate the gaseous fuel around the compressor when the pressure of the gaseous fuel in the storage vessel is greater than the second injection pressure when the gaseous fuel is the second gaseous fuel.

11. The apparatus as claimed in claim 7, wherein the controller is programmed to command the bypass valve to the blocking position to fluidly communicate the gaseous fuel from the storage vessel through the compressor when a pressure of the gaseous fuel in the storage vessel is less than the first injection pressure when the gaseous fuel is the first gaseous fuel, and the controller is programmed to command the bypass valve to the blocking position to fluidly communicate the gaseous fuel from the storage vessel through the compressor when the pressure of the gaseous fuel in the storage vessel is less than the second injection pressure when the gaseous fuel is the second gaseous fuel.

12. The apparatus as claimed in claim 1, further comprising a hot-wire sensor disposed in a conduit between the storage vessel and the in-cylinder fuel injector and operatively connected with the controller, the hot-wire sensor generating temperature signals representative of the gaseous fuel in the storage vessel, wherein the controller is programmed to receive the temperature signals and determine whether the gaseous fuel is the first gaseous fuel or the second gaseous fuel.

13. The apparatus as claimed in claim 12, wherein the controller is further programmed to determine the mole percent of hydrogen in the gaseous fuel.

14. The apparatus as claimed in claim 1, further comprising:
a first storage vessel for storing the first gaseous fuel;
a first shut-off valve for selectively fluidly communicating the first gaseous fuel from the first storage vessel;
a second storage vessel for storing the second gaseous fuel;
a second shut-off valve for selectively fluidly communicating the second gaseous fuel from the second storage vessel;
a compressor in fluid communication with the first and second shut-off valves and operative to compress the gaseous fuel from the first or second storage vessels; and
a bypass valve in fluid communication with the first and second shut-off valves and selectively commanded by the controller to a bypass position to fluidly communicate the first or second gaseous fuel from the first or second storage vessels, respectively, around the compressor, and a blocking position to fluidly communicate the first or second gaseous fuel from the first or second storage vessels, respectively, through the compressor; and the controller is programmed to command the first shut-off valve to open when fueling with the first gaseous fuel and to command the second shut-off valve to open when fueling with the second gaseous fuel;

wherein the second storage vessel stores the second gaseous fuel as a compressed gas; and the in-cylinder fuel injector fluidly receives the first gaseous fuel or the second gaseous fuel from the compressor or the bypass valve.

15. The apparatus as claimed in claim 14, wherein when fueling with the second gaseous fuel, the controller is programmed to command the bypass valve to the bypass position to fluidly communicate the second gaseous fuel from the second storage vessel around the compressor when a pressure of the second gaseous fuel in the second storage vessel is greater than the second injection pressure; and/or to command the bypass valve to the blocking position to fluidly communicate the second gaseous fuel from the second storage vessel through the compressor when a pressure of the second gaseous fuel in the second storage vessel is less than the second injection pressure.

16. The apparatus as claimed in claim 14, wherein the first storage vessel stores the first gaseous fuel as a liquefied gas.

17. The apparatus as claimed in claim 14, wherein the first storage vessel stores the first gaseous fuel as a compressed gas.

18. The apparatus as claimed in claim 17, wherein when fueling with the first gaseous fuel, the controller is programmed to command the bypass valve to the bypass position to fluidly communicate the first gaseous fuel from the first storage vessel around the compressor when a pressure of the first gaseous fuel in the first storage vessel is greater than the first injection pressure; and/or the controller is programmed to command the bypass valve to the blocking position to fluidly communicate the first gaseous fuel from the first storage vessel through the compressor when a pressure of the first gaseous fuel in the first storage vessel is less than the first injection pressure.

19. The apparatus as claimed in claim 1, wherein the second injection pressure is at least 5 percent less than the first injection pressure at the engine load and the engine speed.

20. The apparatus as claimed in claim 1, wherein when fueling with the second gaseous fuel, the second injection pressure equals a product of a peak cylinder pressure times a multiplication factor, the multiplication factor is within a range of 1.15 and 1.4.

21. A method for regulating and injecting a first gaseous fuel and/or a second gaseous fuel in an internal combustion engine comprising:

when fueling the internal combustion engine with the first gaseous fuel:

regulating pressure of the first gaseous fuel to a first injection pressure at an engine load and an engine speed; and injecting within 90 crank angle degrees of top dead center during a compression stroke of the engine an injected quantity of the first gaseous fuel into a combustion chamber of the engine at the first injection pressure; and when fueling the internal combustion engine with the second gaseous fuel:

regulating pressure of the second gaseous fuel to a second injection pressure at the engine load and the engine speed; and injecting within 90 crank angle degrees of top dead center during a compression stroke of the engine an injected quantity of the second gaseous fuel into the combustion chamber of the engine at the second injection pressure;

wherein the first gaseous fuel comprises a gaseous fuel having less mole percent hydrogen than the second gaseous fuel;

the second injection pressure is less than the first injection pressure at the engine load and the engine speed by a pressure value; and the injected quantity of the first gaseous fuel and the injected quantity of the second gaseous fuel burn in a diffusion combustion mode.

22. The method as claimed in claim 21, further comprising:

determining a gaseous fuel type by receiving a signal representative of the gaseous fuel type;

selecting the first injection pressure at the engine load and the engine speed when the gaseous fuel is the first gaseous fuel;

selecting the second injection pressure at the engine load and the engine speed when the gaseous fuel is the second gaseous fuel.

23. The method as claimed in claim 22, wherein the signal representative of the gaseous fuel-type is from at least one of a fuel-type switch, hot-wire sensor, combustion sensor, capacitance sensor, dynamic viscosity sensor, and acoustic wave and phase detection sensor.

24. The method as claimed in claim 21, wherein the pressure value is a function of a mole percent of hydrogen in the second gaseous fuel.

25. The method as claimed in claim 21, wherein the pressure value is a function of a difference in mole percent hydrogen between the second gaseous fuel and the first gaseous fuel.

26. The method as claimed in claim 21, wherein the pressure value is a function of the first gaseous fuel type.

27. The method as claimed in claim 21, wherein the first gaseous fuel comprises less than 1 mole percent hydrogen; and the second gaseous fuel comprises 5 mole percent hydrogen or greater.

28. The method as claimed in claim 27, wherein the second gaseous fuel further comprises one of biogas, ethane, methane, natural gas, butane, propane, or mixtures of these fuels.

29. The method as claimed in claim 21, wherein the first gaseous fuel comprises biogas, ethane, methane, natural gas, butane, propane, or mixtures of these fuels; and/or the second gaseous fuel is substantially hydrogen.

30. The method as claimed in claim 21, wherein when fueling with the second gaseous fuel, injecting the second gaseous fuel at a second injection pressure that equals a product of a peak cylinder pressure times a multiplication factor, the multiplication factor is within a range of 1.15 and 1.4.

* * * * *